(12) United States Patent
Garcia et al.

(10) Patent No.: US 11,943,191 B2
(45) Date of Patent: Mar. 26, 2024

(54) LIVE LOCATION SHARING

(71) Applicant: Apple Inc., Cupertino, CA (US)

(72) Inventors: Roberto Garcia, Mountain View, CA (US); Eugene M. Bistolas, Mountain View, CA (US); Justin Wood, Sunnyvale, CA (US); Lawrence Yuan Yang, San Francisco, CA (US); Scott Lopatin, San Francisco, CA (US); Richard R. Dellinger, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/532,349

(22) Filed: Aug. 5, 2019

(65) Prior Publication Data

US 2020/0028813 A1    Jan. 23, 2020

Related U.S. Application Data

(63) Continuation of application No. 14/503,270, filed on Sep. 30, 2014, now Pat. No. 10,382,378.

(60) Provisional application No. 62/006,110, filed on May 31, 2014.

(51) Int. Cl.
    *H04L 51/222*    (2022.01)
    *G06F 3/04842*   (2022.01)
    *H04L 51/043*    (2022.01)

(52) U.S. Cl.
    CPC .......... *H04L 51/222* (2022.05); *H04L 51/043* (2013.01); *G06F 3/04842* (2013.01)

(58) Field of Classification Search
    CPC .... H04L 51/20; H04L 51/043; G06F 3/04842
    See application file for complete search history.

(56) References Cited

U.S. PATENT DOCUMENTS

| 5,475,653 A | 12/1995 | Yamada et al. |
|---|---|---|
| 5,801,700 A | 9/1998 | Ferguson |
| 6,002,402 A | 12/1999 | Schacher |
| 6,040,781 A | 3/2000 | Murray |

(Continued)

FOREIGN PATENT DOCUMENTS

| AU | 2016102028 | 7/2017 |
|---|---|---|
| CN | 1475924 A | 2/2004 |

(Continued)

OTHER PUBLICATIONS

International Search Report in International Application No. PCT/US2012/038718, dated Aug. 17, 2012, 3 pages.

(Continued)

*Primary Examiner* — Andrew T Chiusano
(74) *Attorney, Agent, or Firm* — Aikin & Gallant, LLP

(57) ABSTRACT

Techniques for live location sharing are described. A first mobile device and a second mobile device can communicate with one another using an IM program. The first mobile device can receive a user input to share a location of the first mobile device in the IM program. Sharing the location can include causing the second mobile device to display a location of the first mobile device in an IM program user interface on the second mobile device. Duration of sharing the location can be user-configurable. The second mobile device may or may not share a location of the second device for display in the IM program executing on the first mobile device.

20 Claims, 10 Drawing Sheets

(56) References Cited

U.S. PATENT DOCUMENTS

| | | |
|---|---|---|
| 6,191,807 B1 | 2/2001 | Hamada et al. |
| 6,323,846 B1 | 11/2001 | Westerman et al. |
| 6,362,842 B1 | 3/2002 | Tahara et al. |
| 6,515,585 B2 | 2/2003 | Yamamoto |
| 6,570,557 B1 | 5/2003 | Westerman et al. |
| 6,677,932 B1 | 1/2004 | Westerman et al. |
| 6,809,724 B1 | 10/2004 | Shiraishi et al. |
| 7,015,817 B2 | 3/2006 | Copley et al. |
| 7,039,420 B2 | 5/2006 | Koskinen et al. |
| 7,076,257 B2 | 7/2006 | Kall |
| 7,224,987 B1 | 5/2007 | Bhela et al. |
| 7,365,736 B2 | 4/2008 | Marvit et al. |
| 7,593,749 B2 | 9/2009 | Vallstrom et al. |
| 7,614,008 B2 | 11/2009 | Ording et al. |
| 7,633,076 B2 | 12/2009 | Huppi et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,789,225 B2 | 9/2010 | Whiteis |
| 7,801,542 B1 | 9/2010 | Stewart |
| 7,834,861 B2 | 11/2010 | Lee |
| 7,844,914 B2 | 11/2010 | Andre et al. |
| 7,908,219 B2 | 3/2011 | Abanami et al. |
| 7,953,393 B2 | 5/2011 | Chin et al. |
| 7,957,762 B2 | 6/2011 | Herz et al. |
| 8,006,002 B2 | 8/2011 | Kalayjian et al. |
| 8,121,586 B2 | 2/2012 | Araradian et al. |
| 8,150,930 B2 | 4/2012 | Satterfield et al. |
| 8,239,784 B2 | 8/2012 | Hotelling et al. |
| 8,244,468 B2 | 8/2012 | Scailisi et al. |
| 8,255,830 B2 | 8/2012 | Ording et al. |
| 8,279,180 B2 | 10/2012 | Hotelling et al. |
| 8,285,258 B2 | 10/2012 | Schultz et al. |
| 8,369,867 B2 | 2/2013 | Van Os et al. |
| 8,374,575 B2 | 2/2013 | Mullen |
| 8,381,135 B2 | 2/2013 | Hotelling et al. |
| 8,412,154 B1 | 4/2013 | Leemet et al. |
| 8,441,367 B1 | 5/2013 | Lee et al. |
| 8,479,122 B2 | 7/2013 | Hotelling et al. |
| 8,572,493 B2 | 10/2013 | Qureshi |
| 8,786,458 B1 | 7/2014 | Wiltzius et al. |
| 8,811,951 B1 | 8/2014 | Faaborg et al. |
| 8,855,665 B2 | 10/2014 | Buford et al. |
| 8,922,485 B1 | 12/2014 | Lloyd |
| 8,971,924 B2 | 3/2015 | Pai et al. |
| 8,989,773 B2 | 3/2015 | Sandel et al. |
| 9,100,944 B2 | 8/2015 | Newham et al. |
| 9,185,062 B1 | 11/2015 | Yang et al. |
| 9,191,988 B2 | 11/2015 | Newham et al. |
| 9,204,283 B2 | 12/2015 | Mullen |
| 9,207,835 B1 | 12/2015 | Yang et al. |
| 9,247,377 B2 | 1/2016 | Pai et al. |
| 9,294,882 B2 | 3/2016 | Sandel et al. |
| 9,369,833 B2 * | 6/2016 | Tharshanan ............ H04W 4/12 |
| 9,400,489 B2 | 7/2016 | Kim et al. |
| 9,402,153 B2 | 7/2016 | Pai et al. |
| 9,477,208 B2 | 10/2016 | Lee et al. |
| 9,635,540 B2 | 4/2017 | Mullen |
| 9,699,617 B2 | 7/2017 | Sandel et al. |
| 10,382,378 B2 | 8/2019 | Garcia et al. |
| 2002/0015024 A1 | 2/2002 | Westerman et al. |
| 2002/0037715 A1 | 3/2002 | Mauney et al. |
| 2002/0102989 A1 | 8/2002 | Calvert et al. |
| 2002/0115478 A1 | 8/2002 | Fujisawa et al. |
| 2002/0126135 A1 | 9/2002 | Ball et al. |
| 2003/0081506 A1 | 5/2003 | Karhu |
| 2003/0128163 A1 | 7/2003 | Mizugaki et al. |
| 2004/0041841 A1 | 3/2004 | LeMogne et al. |
| 2004/0070511 A1 | 4/2004 | Kim |
| 2004/0180669 A1 | 9/2004 | Kall |
| 2004/0203854 A1 | 10/2004 | Nowak |
| 2005/0032532 A1 | 2/2005 | Kokkonen et al. |
| 2005/0138552 A1 | 6/2005 | Venolia |
| 2005/0148340 A1 | 7/2005 | Guyot |
| 2005/0190059 A1 | 9/2005 | Wehrenberg |
| 2005/0191159 A1 | 9/2005 | Benko |
| 2005/0222756 A1 | 10/2005 | Davis et al. |
| 2005/0268237 A1 | 12/2005 | Crane et al. |
| 2005/0288036 A1 | 12/2005 | Brewer et al. |
| 2006/0017692 A1 | 1/2006 | Wehrenberg et al. |
| 2006/0019649 A1 | 1/2006 | Feinleib et al. |
| 2006/0026245 A1 | 2/2006 | Cunningham et al. |
| 2006/0026536 A1 | 2/2006 | Hotelling et al. |
| 2006/0030333 A1 | 2/2006 | Ward et al. |
| 2006/0033724 A1 | 2/2006 | Chaudhri et al. |
| 2006/0044283 A1 | 3/2006 | Eri et al. |
| 2006/0063538 A1 | 3/2006 | Ishii |
| 2006/0092177 A1 | 5/2006 | Blasko |
| 2006/0195787 A1 | 8/2006 | Topiwala et al. |
| 2006/0197753 A1 | 9/2006 | Hotelling et al. |
| 2006/0223518 A1 | 10/2006 | Haney |
| 2007/0036300 A1 | 2/2007 | Brown et al. |
| 2007/0085157 A1 | 4/2007 | Fadell et al. |
| 2007/0117549 A1 | 5/2007 | Amos |
| 2007/0129888 A1 | 6/2007 | Rosenberg |
| 2007/0150834 A1 | 6/2007 | Muller et al. |
| 2007/0150836 A1 | 6/2007 | Deggelmann et al. |
| 2007/0216659 A1 | 9/2007 | Amineh |
| 2007/0236475 A1 | 10/2007 | Wherry |
| 2008/0004043 A1 | 1/2008 | Wilson et al. |
| 2008/0014989 A1 | 1/2008 | Sandegard et al. |
| 2008/0045232 A1 | 2/2008 | Cone |
| 2008/0052945 A1 | 3/2008 | Matas et al. |
| 2008/0055264 A1 | 3/2008 | Anzures et al. |
| 2008/0057926 A1 | 3/2008 | Forstall et al. |
| 2008/0070593 A1 | 3/2008 | Altman |
| 2008/0079589 A1 | 4/2008 | Blackadar |
| 2008/0114539 A1 | 5/2008 | Lim |
| 2008/0139219 A1 | 6/2008 | Boeiro et al. |
| 2008/0153517 A1 | 6/2008 | Lee |
| 2008/0165136 A1 | 7/2008 | Christie et al. |
| 2008/0176583 A1 | 7/2008 | Brachet et al. |
| 2008/0186165 A1 | 8/2008 | Bertagna et al. |
| 2008/0216022 A1 | 9/2008 | Lorch et al. |
| 2008/0287151 A1 | 11/2008 | Fjelstad et al. |
| 2008/0320391 A1 | 12/2008 | Lemay et al. |
| 2009/0005011 A1 | 1/2009 | Christie et al. |
| 2009/0005018 A1 | 1/2009 | Forstall et al. |
| 2009/0006566 A1 | 1/2009 | Veeramachaneni et al. |
| 2009/0011340 A1 | 1/2009 | Lee et al. |
| 2009/0037536 A1 | 2/2009 | Braam |
| 2009/0049502 A1 | 2/2009 | Levien et al. |
| 2009/0051648 A1 | 2/2009 | Shamaie et al. |
| 2009/0051649 A1 | 2/2009 | Rondel |
| 2009/0055494 A1 | 2/2009 | Fukumoto |
| 2009/0066564 A1 | 3/2009 | Burroughs et al. |
| 2009/0085806 A1 | 4/2009 | Piersol et al. |
| 2009/0098903 A1 | 4/2009 | Donaldson et al. |
| 2009/0113340 A1 | 4/2009 | Bender |
| 2009/0164219 A1 | 6/2009 | Yeung et al. |
| 2009/0177981 A1 | 7/2009 | Christie et al. |
| 2009/0181726 A1 | 7/2009 | Vargas et al. |
| 2009/0187842 A1 | 7/2009 | Collins et al. |
| 2009/0254840 A1 | 10/2009 | Churchill et al. |
| 2009/0298444 A1 | 12/2009 | Shigeta |
| 2009/0303066 A1 | 12/2009 | Lee et al. |
| 2009/0312032 A1 | 12/2009 | Bornstein et al. |
| 2009/0313582 A1 | 12/2009 | Rupsingh et al. |
| 2009/0319616 A1 | 12/2009 | Lewis et al. |
| 2009/0322560 A1 | 12/2009 | Tengler et al. |
| 2009/0325603 A1 * | 12/2009 | Van Os .................. H04W 4/029 455/456.2 |
| 2010/0004005 A1 | 1/2010 | Pereira et al. |
| 2010/0017126 A1 | 1/2010 | Holeman |
| 2010/0058231 A1 | 3/2010 | Duarte et al. |
| 2010/0069035 A1 | 3/2010 | Johnson |
| 2010/0124906 A1 | 5/2010 | Hautala |
| 2010/0125411 A1 | 5/2010 | Goel |
| 2010/0125785 A1 | 5/2010 | Moore et al. |
| 2010/0144368 A1 | 6/2010 | Sullivan et al. |
| 2010/0203901 A1 | 8/2010 | Dinoff et al. |
| 2010/0205242 A1 | 8/2010 | Marchioro, II et al. |
| 2010/0221425 A1 | 8/2010 | Govindarajan |
| 2010/0240398 A1 | 9/2010 | Hotes et al. |

(56) References Cited

U.S. PATENT DOCUMENTS

| | | |
|---|---|---|
| 2010/0248744 A1 | 9/2010 | Bychkov et al. |
| 2010/0250727 A1 | 9/2010 | King et al. |
| 2010/0274569 A1 | 10/2010 | Reudink |
| 2010/0281409 A1 | 11/2010 | Rainisto et al. |
| 2010/0287178 A1 | 11/2010 | Lambert et al. |
| 2010/0299060 A1 | 11/2010 | Snavely et al. |
| 2010/0325194 A1* | 12/2010 | Williamson ......... H04W 4/029 709/203 |
| 2010/0330952 A1 | 12/2010 | Yeoman et al. |
| 2010/0332518 A1 | 12/2010 | Song et al. |
| 2011/0003587 A1 | 1/2011 | Belz et al. |
| 2011/0051658 A1 | 3/2011 | Jin et al. |
| 2011/0054780 A1 | 3/2011 | Dhanani et al. |
| 2011/0054979 A1 | 3/2011 | Cova et al. |
| 2011/0059769 A1 | 3/2011 | Bmnolli |
| 2011/0066743 A1 | 3/2011 | Hurley et al. |
| 2011/0080356 A1 | 4/2011 | Kang et al. |
| 2011/0096011 A1 | 4/2011 | Suzuki |
| 2011/0118975 A1 | 5/2011 | Chen |
| 2011/0137813 A1 | 6/2011 | Stewart |
| 2011/0137954 A1 | 6/2011 | Diaz |
| 2011/0138006 A1 | 6/2011 | Stewart |
| 2011/0148626 A1 | 6/2011 | Acevedo |
| 2011/0151418 A1 | 6/2011 | Delespaul et al. |
| 2011/0157046 A1 | 6/2011 | Lee et al. |
| 2011/0164058 A1 | 7/2011 | Lemay |
| 2011/0167383 A1 | 7/2011 | Schuller et al. |
| 2011/0183650 A1 | 7/2011 | McKee |
| 2011/0225547 A1 | 9/2011 | Fong et al. |
| 2011/0239158 A1 | 9/2011 | Barraclough et al. |
| 2011/0250909 A1 | 10/2011 | Mathias et al. |
| 2011/0254684 A1 | 10/2011 | Antoci |
| 2011/0265041 A1 | 10/2011 | Ganetakos et al. |
| 2011/0276901 A1 | 11/2011 | Zambetti et al. |
| 2011/0279323 A1 | 11/2011 | Hung et al. |
| 2011/0306366 A1 | 12/2011 | Trussel et al. |
| 2011/0306393 A1 | 12/2011 | Goldman et al. |
| 2011/0307124 A1 | 12/2011 | Morgan et al. |
| 2011/0316769 A1 | 12/2011 | Boettcher et al. |
| 2012/0008526 A1 | 1/2012 | Borghei |
| 2012/0022872 A1 | 1/2012 | Gruber et al. |
| 2012/0040681 A1 | 2/2012 | Yan et al. |
| 2012/0054028 A1 | 3/2012 | Tengler et al. |
| 2012/0077463 A1 | 3/2012 | Robbins et al. |
| 2012/0088521 A1 | 4/2012 | Nishida et al. |
| 2012/0095918 A1 | 4/2012 | Jurss |
| 2012/0102437 A1 | 4/2012 | Worley et al. |
| 2012/0105358 A1 | 5/2012 | Momeyer |
| 2012/0108215 A1 | 5/2012 | Kameli et al. |
| 2012/0117507 A1 | 5/2012 | Tseng et al. |
| 2012/0131458 A1 | 5/2012 | Hayes |
| 2012/0136997 A1 | 5/2012 | Yan et al. |
| 2012/0144452 A1 | 6/2012 | Dyor et al. |
| 2012/0149405 A1 | 6/2012 | Bhat |
| 2012/0150970 A1 | 6/2012 | Peterson et al. |
| 2012/0158511 A1 | 6/2012 | Lucero et al. |
| 2012/0166531 A1 | 6/2012 | Sylvain |
| 2012/0172088 A1 | 7/2012 | Kirch et al. |
| 2012/0208592 A1 | 8/2012 | Davis et al. |
| 2012/0216127 A1 | 8/2012 | Meyr |
| 2012/0218177 A1 | 8/2012 | Pang et al. |
| 2012/0222083 A1 | 8/2012 | Vaha-Sipila et al. |
| 2012/0239949 A1 | 9/2012 | Kalvanasundaram et al. |
| 2012/0258726 A1 | 10/2012 | Bansal et al. |
| 2012/0265823 A1 | 10/2012 | Parmar et al. |
| 2012/0276919 A1 | 11/2012 | Bi |
| 2012/0290648 A1 | 11/2012 | Sharkey |
| 2012/0302256 A1 | 11/2012 | Pai et al. |
| 2012/0302258 A1 | 11/2012 | Pai et al. |
| 2012/0304084 A1 | 11/2012 | Kim et al. |
| 2012/0306770 A1 | 12/2012 | Moore et al. |
| 2013/0002580 A1 | 1/2013 | Sudou |
| 2013/0007665 A1 | 1/2013 | Chaudhri et al. |
| 2013/0045759 A1 | 2/2013 | Smith |
| 2013/0063364 A1 | 3/2013 | Moore |
| 2013/0065566 A1 | 3/2013 | Gisby et al. |
| 2013/0091298 A1 | 4/2013 | Ozzie et al. |
| 2013/0093833 A1 | 4/2013 | Al-Asaaed et al. |
| 2013/0120106 A1 | 5/2013 | Cauwels et al. |
| 2013/0143586 A1 | 6/2013 | Williams et al. |
| 2013/0159941 A1 | 6/2013 | Langlois et al. |
| 2013/0212470 A1 | 8/2013 | Karunamuni et al. |
| 2013/0222236 A1 | 8/2013 | Gardenfors et al. |
| 2013/0226453 A1* | 8/2013 | Trussel ............. G01C 21/3614 701/533 |
| 2013/0234924 A1 | 9/2013 | Janefalkar et al. |
| 2013/0244633 A1 | 9/2013 | Jacobs et al. |
| 2013/0254714 A1 | 9/2013 | Shin et al. |
| 2013/0262298 A1 | 10/2013 | Morley |
| 2013/0275924 A1 | 10/2013 | Weinberg et al. |
| 2013/0303190 A1 | 11/2013 | Khan et al. |
| 2013/0305331 A1 | 11/2013 | Kim |
| 2013/0307809 A1 | 11/2013 | Sudou |
| 2013/0310089 A1 | 11/2013 | Gianoukos et al. |
| 2013/0321314 A1 | 12/2013 | Oh et al. |
| 2013/0322634 A1 | 12/2013 | Bennett et al. |
| 2013/0346882 A1 | 12/2013 | Shipiacoff et al. |
| 2013/0347018 A1 | 12/2013 | limp et al. |
| 2014/0026099 A1* | 1/2014 | Andersson Reimer .................... G06F 3/0482 715/825 |
| 2014/0055552 A1 | 2/2014 | Song et al. |
| 2014/0058873 A1 | 2/2014 | Sorensen et al. |
| 2014/0062790 A1 | 3/2014 | Letz et al. |
| 2014/0066105 A1 | 3/2014 | Bridge et al. |
| 2014/0073256 A1 | 3/2014 | Newham et al. |
| 2014/0085487 A1 | 3/2014 | Park et al. |
| 2014/0099973 A1 | 4/2014 | Cecchini et al. |
| 2014/0136990 A1 | 5/2014 | Gonnen et al. |
| 2014/0181183 A1 | 6/2014 | Houjou et al. |
| 2014/0189533 A1 | 7/2014 | Krack et al. |
| 2014/0222933 A1 | 8/2014 | Stovicek et al. |
| 2014/0237126 A1* | 8/2014 | Bridge ................ H04W 4/02 709/227 |
| 2014/0240122 A1 | 8/2014 | Roberts et al. |
| 2014/0344711 A1 | 11/2014 | Hallerstrom et al. |
| 2014/0365944 A1 | 12/2014 | Moore et al. |
| 2015/0007049 A1 | 1/2015 | Langlois et al. |
| 2015/0040029 A1 | 2/2015 | Koum et al. |
| 2015/0089660 A1 | 3/2015 | Song et al. |
| 2015/0100537 A1 | 4/2015 | Grieves et al. |
| 2015/0102992 A1 | 4/2015 | Klement et al. |
| 2015/0172393 A1 | 6/2015 | Oplinger et al. |
| 2015/0180746 A1 | 6/2015 | Day, II et al. |
| 2015/0185849 A1 | 7/2015 | Levesque et al. |
| 2015/0188869 A1 | 7/2015 | Gilad et al. |
| 2015/0248389 A1 | 9/2015 | Kalm et al. |
| 2015/0264303 A1 | 9/2015 | Chastney et al. |
| 2015/0286387 A1 | 10/2015 | Gu et al. |
| 2015/0286391 A1 | 10/2015 | Jacobs et al. |
| 2015/0312185 A1 | 10/2015 | Lanqholz et al. |
| 2015/0346912 A1 | 12/2015 | Yang et al. |
| 2015/0350130 A1 | 12/2015 | Yang et al. |
| 2015/0350140 A1 | 12/2015 | Garcia et al. |
| 2015/0350141 A1 | 12/2015 | Yang et al. |
| 2016/0036735 A1 | 2/2016 | Pycock et al. |
| 2016/0036996 A1 | 2/2016 | Midholt et al. |
| 2016/0054841 A1 | 2/2016 | Yang et al. |
| 2016/0073223 A1 | 3/2016 | Woolsey et al. |
| 2016/0234060 A1 | 8/2016 | Pai et al. |
| 2016/0294958 A1 | 10/2016 | Zhang |
| 2016/0295384 A1 | 10/2016 | Shan et al. |
| 2016/0299526 A1 | 10/2016 | Inagaki et al. |
| 2016/0342141 A1 | 11/2016 | Koumaiha |
| 2017/0026796 A1 | 1/2017 | Pai et al. |
| 2017/0083189 A1 | 3/2017 | Yang et al. |
| 2017/0083202 A1 | 3/2017 | Yang et al. |

(56) References Cited

U.S. PATENT DOCUMENTS

| | | | |
|---|---|---|---|
| 2017/0220212 | A1 | 8/2017 | Yang et al. |
| 2018/0091951 | A1 | 3/2018 | Sandel et al. |

FOREIGN PATENT DOCUMENTS

| | | |
|---|---|---|
| CN | 1852335 | 10/2006 |
| CN | 101390371 | 3/2009 |
| CN | 102098656 | 6/2011 |
| CN | 102111505 | 6/2011 |
| CN | 201928419 | 8/2011 |
| CN | 102695302 | 9/2012 |
| CN | 103207674 | 7/2013 |
| CN | 103309606 | 9/2013 |
| CN | 103500079 | 1/2014 |
| CN | 103583031 | 2/2014 |
| CN | 103959751 | 7/2014 |
| CN | 104205785 | 12/2014 |
| CN | 205263700 | 5/2016 |
| EP | 1387590 | 2/2004 |
| EP | 2574026 | 3/2013 |
| EP | 2610701 A1 | 7/2013 |
| EP | 2610701 A9 | 4/2014 |
| EP | 2849042 | 3/2015 |
| JP | 2002-366485 | 12/2002 |
| JP | 2003-516057 | 5/2003 |
| JP | 2003-207556 | 7/2003 |
| JP | 2006-072489 | 3/2006 |
| JP | 2006-079427 | 3/2006 |
| JP | 2006-113637 | 4/2006 |
| JP | 2006-129429 | 5/2006 |
| JP | 2009-081865 | 4/2009 |
| JP | 2010-503126 | 1/2010 |
| JP | 2010-503332 | 1/2010 |
| JP | 2010-288162 | 12/2010 |
| JP | 2010-539804 | 12/2010 |
| JP | 2011-060065 | 3/2011 |
| JP | 2011-107823 | 6/2011 |
| JP | 2012-508530 | 4/2012 |
| JP | 2012-198369 | 10/2012 |
| JP | 2013-048389 | 3/2013 |
| JP | 2014-057129 | 3/2014 |
| KR | 10-2004-0089329 | 10/2004 |
| KR | 2007-0096222 | 10/2007 |
| KR | 2008-0074813 | 8/2008 |
| TW | 200532429 | 10/2005 |
| WO | 2001/041468 | 6/2001 |
| WO | 2002/003093 | 1/2002 |
| WO | 2008/030972 | 3/2008 |
| WO | 2009/071112 | 6/2009 |
| WO | 2010/048995 | 5/2010 |
| WO | 2010/054373 | 5/2010 |
| WO | 2011/080622 | 7/2011 |
| WO | 2012/128824 | 9/2012 |
| WO | 2012/170446 | 12/2012 |
| WO | 2013/093558 | 6/2013 |
| WO | 2013/169842 | 11/2013 |
| WO | 2013/169865 | 11/2013 |
| WO | 2013/169875 | 11/2013 |
| WO | 2014/083001 | 6/2014 |
| WO | 2014/105276 | 7/2014 |
| WO | 2015/038684 | 3/2015 |
| WO | 2015/120358 | 8/2015 |
| WO | 2016/036472 | 3/2016 |

OTHER PUBLICATIONS

International Search Report and Written Opinion in International Application No. PCT/US13/41780, dated Dec. 1, 2014, 8 pages.
International Preliminary Report on Patent Ability in International Application No. PCT/US13/41780, dated Dec. 9, 2014, 7 pages.
Japanese Office Action in Japanese Application No. 2012-113725, dated May 27, 2013, 9 pages (with English Translation).
Korean Preliminary Rejection in Korean Application No. 10-2012-54888, dated Sep. 5, 2014, 9 pages (with English Translation).
Search and Examination Report in GB Application No. GB1209044.5, dated Aug. 24, 2012, 10 pages.
U.S. Final Office Action in U.S. Appl. No. 13/113,856, dated Nov. 7, 2012, 19 pages.
U.S. Final Office Action in U.S. Appl. No. 13/488,430, dated May 8, 2013, 19 pages.
U.S. Non-Final Office Action in U.S. Appl. No. 13/113,856, dated Jul. 18, 2012, 14 pages.
U.S. Non-Final Office Action in U.S. Appl. No. 13/488,430, dated Dec. 5, 2012, 13 pages.
Written Opinion in International Application No. PCT/US/2012/038718, dated Aug. 17, 2012, 4 pages.
Australian Patent Examination Report No. 1 in Australian Application No. 2013203926, dated Oct. 7, 2014, 5 pages.
Australian Patent Examination Report No. 2 in Australian Application No. 2013203926, dated Jan. 13, 2016, 3 pages.
European Extended Search Report in Application No. 16155938.0, dated Jun. 7, 2016, 8 pages.
Chinese Office Action for Application No. 201210288784.3, dated Jan. 5, 2017, 13 pages (with English translation).
India Office Action for Application No. 2030/CHE/2012, dated Dec. 27, 2016, 9 pages.
Chinese Notification of Reexamination for Application No. 201210288784.3, dated Sep. 27, 2017, 17 pages (with English translation).
Australian Certificate of Examination in Australian Patent Application No. 2017100760 dated Feb. 9, 2018, 2 pages.
Australian Notice of Acceptance in Australian Paten Application No. 2015267259, dated Jan. 30, 2018, 3 pages.
Australian Notice of Acceptance in Australian Patent Application No. 2015267260, dated Jan. 30, 2018, 3 pages.
Australian Notice of Acceptance in Australian Patent Application No. 2015312369, dated Mar. 21, 2018, 3 pages.
Australian Office Action in Australian Patent Application No. 2015100711, dated Jul. 27, 2015, 7 pages.
Australian Office Action in Australian Patent Application No. 2015100711, dated Nov. 19, 2015, 6 pages.
Australian Office Action in Australian Patent Application No. 2015101188, dated Apr. 14, 2016, 3 pages.
Australian Office Action in Australian Patent Application No. 2015267259, dated Jun. 2, 2017, 2 pages.
Australian Office Action in Australian Patent Application No. 2015267260, dated Jun. 2, 2017, 2 pages.
Australian Office Action in Australian Patent Application No. 2015312369, dated Mar. 29, 2017, 3 Pages.
Australian Office Action in Australian Patent Application No. 2016102028, dated Feb. 13, 2017, 4 pages.
Australian Office Action in Australian Patent Application No. 2016102029, dated Feb. 22, 2017, 4 pages.
Australian Office Action in Australian Patent Application No. 2017100197, dated Apr. 28, 2017, 4 Pages.
Australian Office Action in Australian Patent Application No. 2017100198, dated Apr. 20, 2017, 4 pages.
Australian Office Action in Australian Patent Application No. 2017100760, dated Aug. 10, 2017, 4 pages.
Australian Office Action in Australian Patent Application No. 2017100760, dated Jan. 30, 2018, 3 pages.
Australian Office Action in Australian Patent Application No. 2018204430, dated Aug. 15, 2018, 5 pages.
Chinese Notice of Allowance received for Chinese Patent Application No. 201510290133.1, dated Jan. 9, 2019, 3 pages with English Translation.
Chinese Notice of Allowance received for Chinese Patent Application No. 201510291012.9, dated Jan. 9, 2019, 3 pages with English Translation.
Chinese Notice of Allowance received for Chinese Patent Application No. 201520365358.4, dated Nov. 20, 2015, 2 pages with English Translation.
Chinese Notice of Allowance received for Chinese Patent Application No. 201520365843.1, dated Feb. 15, 2016, 3 pages with English Translation.

(56) References Cited

OTHER PUBLICATIONS

Chinese Notice of Allowance received for Chinese Patent Application No. 201520669842.6, dated May 18, 2016, 2 pages with English Translation.
Chinese Office Action received for Chinese Patent Application No. 201510290133.1, dated Feb. 9, 2018, 10 pages with English Translation.
Chinese Office Action received for Chinese Patent Application No. 201510291012.9, dated Feb. 8, 2018, 9 pages with English Translation.
Chinese Office Action received for Chinese Patent Application No. 201510549056.7, dated Aug. 7, 2018, 7 pages with English Translation.
Chinese Office Action received for Chinese Patent Application No. 201510549056.7, dated Nov. 24, 2017, 22 pages with English Translation.
Chinese Office Action received for Chinese Patent Application No. 201520365358.4, dated Aug. 11, 2015, 4 pages with English Translation.
Chinese Office Action received for Chinese Patent Application No. 201520365843.1, dated Aug. 25, 2015, 4 pages with English Translation.
Chinese Office Action received for Chinese Patent Application No. 201520365843.1, dated Nov. 16, 2015, 3 pages with English Translation.
Chinese Office Action received for Chinese Patent Application No. 201520669842.6, dated Dec. 4, 2015, 7 pages with English Translation.
Chinese Office Action received for Chinese Patent Application No. 201620393549.6, dated Aug. 18, 2016, 2 pages with English Translation.
Chinese Office Action received for Chinese Patent Application No. 201620393748.7, dated Aug. 18, 2016, 2 pages with English Translation.
Danish Decision to Grant received for Danish Patent Application No. PA201770126, dated Mar. 27, 2018, 2 pages.
Danish Intention to Grant received for Denmark Patent Application No. PA201570550, dated Dec. 22, 2016, 2 pages.
Danish Intention to Grant received for Denmark Patent Application No. PA201770126, dated Jan. 19, 2018, 2 pages.
Danish Notice of Allowance received for Danish Patent Application No. P A201570550, dated Mar. 20, 2017, 2 pages.
Danish Office Action received for Danish Patent Application No. PA201570550, dated Dec. 7, 2015, 5 pages.
Danish Office Action received for Danish Patent Application No. PA201570550, dated Jan. 19, 2016, 2 pages.
Danish Office Action received for Danish Patent Application No. PA201570550, dated Oct. 19, 2016, 3 pages.
Danish Office Action received for Danish Patent Application No. PA201770089, dated Apr. 25, 2017, 10 pages.
Danish Office Action received for Danish Patent Application No. PA201770125, dated Jan. 26, 2018, 5 pages.
Danish Office Action received for Danish Patent Application No. PA201770125, dated Jul. 20, 2018, 2 pages.
Danish Office Action received for Danish Patent Application No. PA201770126, dated Oct. 18, 2017, 3 pages.
Danish Search Report received for Danish Patent Application No. PA201770125, dated May 5, 2017, 10 pages.
Danish Search Report received for Danish Patent Application No. PA201770126, dated Apr. 26, 2017, 8 Pages.
European Extended Search Report in European Patent Application No. 17167629.9, dated Jun. 2, 2017, 7 pages.
European Extended Search Report in European Patent Application No. 18170262.2, dated Jul. 25, 2018, 8 pages.
European Office Action in European Patent Application No. 15728307.8, dated Feb. 8, 2018, 7 pages.
European Office Action in European Patent Application No. 15729286.3, dated Feb. 7, 2018, 7 pages.
European Office Action in European Patent Application No. 15759981.2, dated Apr. 19, 2018, 6 pages.
European Office Action in European Patent Application No. 15759981.2, dated Aug. 6, 2018, 10 pages.
European Office Action in European Patent Application No. 15759981.2, dated May 16, 2018, 6 pages.
European Office Action in European Patent Application No. 17167629.9, dated Jan. 25, 2019, 7 pages.
International Preliminary Report on Patentability received for PCT Application No. PCT/US2015/032309, dated Dec. 15, 2016, 7 pages.
International Preliminary Report on Patentability received for PCT Patent Application No. PCT/US2015/032305, dated Dec. 15, 2016, 7 pages.
International Preliminary Report on Patentability received for PCT Patent Application No. PCT/US2015/043487, dated Feb. 16, 2017, 12 pages.
International Preliminary Report on Patentability received for PCT Patent Application No. PCT/US2015/044083, dated Mar. 16, 2017, 24 pages.
International Preliminary Report on Patentability received for PCT Patent Application No. PCT/US2015/046787, dated Mar. 16, 2017, 18 pages.
International Preliminary Report on Patentability received for PCT Patent Application No. PCT /US2016/046828, dated Mar. 1, 2018, 19 pages.
International Search Report and Written Opinion received for PCT Patent Application No. PCT/US2015/032305, dated Sep. 10, 2015, 9 pages.
International Search Report and Written Opinion received for PCT Patent Application No. PCT/US2015/032309, dated Sep. 2, 2015, 9 pages.
International Search Report and Written Opinion received for PCT Patent Application No. PCT/US2015/043487, dated Jan. 29, 2016, 17 pages.
International Search Report and Written Opinion received for PCT Patent Application No. PCT/US2015/044083, dated Feb. 4, 2016, 31 pages.
International Search Report and Written Opinion received for PCT Patent Application No. PCT/US2015/046787, dated Apr. 1, 2016, 26 pages.
International Search Report and Written Opinion received for PCT Patent Application No. PCT/US2016/046828, dated Dec. 15, 2016, 21 pages.
Invitation to Pay Additional Fees and Partial Search Report received for PCT Patent Application No. PCT/US2015/043487, dated Nov. 9, 2015, 4 pages.
Invitation to Pay Additional Fees received for PCT Patent Application No. PCT/US2015/044083, mailed on Nov. 4, 2015, 11 pages.
Invitation to Pay Additional Fees received for PCT Patent Application No. PCT/US2015/046787, mailed on Dec. 15, 2015, 8 pages.
Invitation to Pay Additional Fees received for PCT Patent Application No. PCT/US2016/046828, mailed on Sep. 23, 2016, 2 pages.
Japanese Notice of Allowance received for Japanese Patent Application No. 2017-510297, dated May 7, 2018, 5 pages with English Translation.
Japanese Notice of Allowance received for Japanese Patent Application No. 2017-514992, dated Feb. 15, 2019, 5 pages with English Translation.
Japanese Notice of Allowance received for Japanese Patent application No. 2017514993, dated Jan. 12, 2018, 6 pages with English Translation.
Japanese Notice of Allowance received for Japanese Patent Application No. 2018-072632, dated Dec. 7, 2018, 6 pages with English Translation.
Japanese Office Action received for Japanese Patent Application No. 2017-510297, dated Dec. 4, 2017, 6 pages with English Translation.
Japanese Office Action received for Japanese Patent Application No. 2017-510297, dated Jul. 10, 2017, 9 pages with English Translation.
Japanese Office Action received for Japanese Patent Application No. 2017-514992, dated Apr. 6, 2018, 9 pages with English Translation.
Japanese Office Action received for Japanese Patent Application No. 2018-018497, dated Dec. 10, 2018, 7 pages with English Translation.

(56) References Cited

OTHER PUBLICATIONS

Japanese Office Action received for Japanese Patent Application No. 2018-072632, dated Jul. 9, 2018, 5 Pages with English Translation.
Korean Notice of Allowance received for Korean Patent Application No. 10-2017-7005628, dated Jun. 18, 2018, 4 pages with English Translation.
Korean Office Action received for Korean Patent Application No. 10-2017-7005628, dated Jan. 30, 2018, 6 pages with English translation.
Korean Office Action received for Korean Patent Application No. 10-2017-7005628, dated May 10, 2017, 11 pages with English Translation.
Korean Office Action received for Korean Patent Application No. 10-2018-7027006, dated Jan. 14, 2019, 4 pages with English Translation.
Netherland Search Report and Opinion received for Netherlands Patent Application No. 2015354, completed on Jun. 22, 2017, 23 pages with English Translation.
Netherland Search Report and Opinion received for Netherlands Patent Application No. 2019878, dated Apr. 6, 2018, 23 pages with English Translation.
Taiwanese Office Action received for Taiwanese Patent Application No. 104107332, dated Oct. 29, 2018, 12 pages with English Translation.
Taiwanese Office Action received for Taiwanese Patent Application No. 104128519, dated Mar. 29, 2017, 16 pages with English Translation.
Taiwanese Office Action received for Taiwanese Patent Application No. 104128704, dated Jul. 31, 2017, 7 pages with English Translation.
Taiwanese Office Action received for Taiwanese Patent Application No. 104128704, dated Nov. 2, 2016, 12 pages with English Translation.
U.S. Notice of Allowance in U.S. Appl. No. 14/503,376, dated Jul. 29, 2015, 12 pages.
U.S. Notice of Allowance in U.S. Appl. No. 14/503,376, dated Sep. 2, 2015, 4 pages.
U.S. Notice of Allowance in U.S. Appl. No. 14/503,376, dated Sep. 24, 2015, 5 pages.
U.S. Notice of Allowance in U.S. Appl. No. 14/503,386, dated Jul. 30, 2015, 11 pages.
U.S. Notice of Allowance in U.S. Appl. No. 14/503,386, dated Sep. 24, 2015, 5 pages.
U.S. Notice of Allowance in U.S. Appl. No. 14/817,572, dated Nov. 30, 2017, 26 pages.
U.S. Notice of Allowance in U.S. Appl. No. 14/838,235, dated Dec. 29, 2016, 3 pages.
U.S. Notice of Allowance in U.S. Appl. No. 14/838,235, dated Oct. 4, 2016, 7 pages.
U.S. Notice of Allowance in U.S. Appl. No. 14/841,608, dated Jan. 25, 2018, 2 pages.
U.S. Notice of Allowance in U.S. Appl. No. 14/841,608, dated Nov. 14, 2017, 5 pages.
U.S. Notice of Allowance in U.S. Appl. No. 14/841,614, dated Jan. 8, 2019, 3 pages.
U.S. Notice of Allowance in U.S. Appl. No. 14/841,614, dated Oct. 24, 2018, 10 pages.
U.S. Notice of Allowance in U.S. Appl. No. 14/841,623, dated Feb. 23, 2018, 8 pages.
U.S. Notice of Allowance in U.S. Appl. No. 15/142,661, dated Oct. 4, 2017, 21 pages.
U.S. Notice of Allowance in U.S. Appl. No. 15/425,273, dated Mar. 7, 2019, 8 pages.
U.S. Notice of Allowance in U.S. Appl. No. 15/431,435, dated Jan. 23, 2018, 8 pages.
U.S. Notice of Allowance in U.S. Appl. No. 15/876,673, dated May 4, 2018, 26 pages.
U.S. Notice of Allowance in U.S. Appl. No. 15/985,570, dated Mar. 13, 2019, 21 pages.
U.S. Office Action in U.S. Appl. No. 14/503,376, dated Dec. 22, 2014, 19 pages.
U.S. Office Action in U.S. Appl. No. 14/503,386, dated Jan. 7, 2015, 18 pages.
U.S. Office Action in U.S. Appl. No. 14/817,572, dated Mar. 23, 2017, 13 pages.
U.S. Office Action in U.S. Appl. No. 14/817,572, dated Sep. 12, 2016, 8 pages.
U.S. Office Action in U.S. Appl. No. 14/838,235, dated Jun. 15, 2016, 17 pages.
U.S. Office Action in U.S. Appl. No. 14/841,608, dated Apr. 12, 2017, 8 pages.
U.S. Office Action in U.S. Appl. No. 14/841,614, dated Jul. 27, 2017, 12 pages.
U.S. Office Action in U.S. Appl. No. 14/841,614, dated May 10, 2018, 12 pages.
U.S. Office Action in U.S. Appl. No. 14/841,623, dated Feb. 2, 2017, 16 pages.
U.S. Office Action in U.S. Appl. No. 14/841,623, dated Sep. 5, 2017, 15 pages.
U.S. Office Action in U.S. Appl. No. 14/928,865, dated Dec. 5, 2018, 14 pages.
U.S. Office Action in U.S. Appl. No. 14/928,865, dated Mar. 27, 2018, 14 pages.
U.S. Office Action in U.S. Appl. No. 15/142,661, dated Jan. 25, 2017, 28 Pages.
U.S. Office Action in U.S. Appl. No. 15/366,763, dated Mar. 8, 2019, 13 pages.
U.S. Office Action in U.S. Appl. No. 15/425,273, dated Oct. 3, 2018, 9 pages.
U.S. Office Action in U.S. Appl. No. 15/431,435, dated Jun. 8, 2017, 10 pages.
U.S. Office Action in U.S. Appl. No. 15/985,570, dated Aug. 16, 2018, 23 pages.
U.S. Office Action received for U.S. Appl. No. 14/838,235, dated Jan. 5, 2016, 18 pages.
absoluteblogger.com' [online]. "WeChat Review—Communication Application with Screenshots" available on or before Jun. 14, 2013, [retrieved on Apr. 23, 2019], via Internet Archive: Wayback Machine URL<http://www.absoluteblogger.com/2012/10/wechat-review-communication-application.html>. 4 pages.
appps.jp' [online]. "WhatsApp" users over 400 million people! I tried to investigate the most used messaging application in the world Jan. 24, 2014, [retrieved on Apr. 23, 2019], via Internet Archive: Wayback Machine URL<https://web.archive.org/web/20140410142411/http://www.appps.jp/2128786>. 13 pages, with Machine English Translation.
digitalstreetsa.com' [online]. "Why WeChat might kill Whatsapp's future . . . " Jul. 3, 2013, retrieved on Apr. 23, 2019], retrieved from: URL<http://digitalstreetsa.com/why-wechat-might-kill-whatsaoos-future>. 9 pages.
download.cnet.com' [online]. "WeChat APK for Android" Jan. 7, 2013, retrieved on Apr. 23, 2019], retrieved from: URL<htto://download.cnet.com/WeChat/3000-2150 4-75739423.html>. 5 pages.
engadget.com' [online]. "WhatsApp Introduces Major New Audio Features," Aug. 7, 2013, retrieved on Apr. 23, 2019], retrieved from: URL<http://www.engadget.com/2013/08/07/whatsapp-introduces-major-new-audio-features>. 12 pages.
heresthethingblog.com' [online]. "iOS 7 tip: Alerts, Banners, and Badgesawhats the Difference?" Jan. 22, 2014, [retrieved on Apr. 23, 2019], via Internet Archive: Wayback Machine URL<https://web.archive.org/web/20140128072440/http://heresthethingblog.com/2014/0I/22/ios-7-tip-whats-difference-alert/>. 5 pages.
IPhone, "User Guide for iOS 7.1 Software", Mar. 2014, 162 pages.
Jng.org' [online]. "Affordances and Design," published on or before Feb. 25, 2010 [retrieved on Apr. 23, 2019], via Internet Archive: Wayback Machine URL<https://web.archive.org/web/20150318044240/jnd.org/dn.mss/affordancesand.html>. 6 pages.
makeuseof.com' [online]. "MS Outlook Tip: How to Automatically Organize Incoming Emails," Sep. 27, 2019, retrieved on Apr. 23, 2019], retrieved from: URL <http://www.makeuseof.com/tag/ms-outlook-productivity-tip-how-to-move-emails-to-individual-folders-automatically>. 5 pages.

(56) References Cited

OTHER PUBLICATIONS manualslib.com' [online]. "Samsung Gear 2 User Manual", 2014, [retrieved on Apr. 23, 2019], retrieved from: URL<http://www.manualslib.com/download/754923/Samsung-Gear-2.html>. 97 pages.
Samsung, "SM-G900F User Manual", English (EU). Rev. 1.0, Mar. 2014, 249 pages.
Samsung, "SM-R380", User Manual, 2014, 74 pages.
seechina365.com' [online]. "How to use China's popular social networking service wechat2_ voice message, press together, shake function etc." Apr. 5, 2014, [retrieved on Apr. 23, 2019], via Internet Archive: Wayback Machine URL<http://seechina365.com/2014/04/05/wechat02>. 29 pages with Machine English Translation.
slideshare.net.' [online]. "Samsung Gear 2 User manual", Apr. 2014, [retrieved on Apr. 23, 2019], retrieved from: URL<http://www.slideshare.net/badaindonesia/samsung-gear-2-user-manual>. 58 pages.
wechat.wikia.com' [online]. "WeChat Wiki", May 14, 2013, [retrieved on Apr. 23, 2019], via Internet Archive: Wayback Machine URL<http://web.archive.org/web/20130514131044/http://wechat.wikia.com/wiki/WeChat_ Wiki>. 6 pages.
wikihow.com' [online]. "How to Move Mail to Different Folders in Gmail," available on or before Jul. 31, 2014, [retrieved on Apr. 23, 2019], via Internet Archive: Wayback Machine URL<https://web.archive.org/web/20140731230338/http://www.wikihow.com/Move-Mail-to-Different-Folders-in-Gmail>. 4 pages.
youtube.com' [online]. "How to Dismiss Banner Notifications or Toast Notifications on iOS7," Dec. 17, 2013, [retrieved on Apr. 23, 2019], retrieved from: URL<https://www.youtube.com/watch?v=vSiHnBFIW M>. 2 pages.
youtube.com' [online]. "How To Send A Picture Message/MMS-Samsung Galaxy Note 3," Nov. 3, 2013, [retrieved on Apr. 23, 2019], retrieved from: URL<https://www.youtube.com/watch?v=-3dOz8-KeDw>. \2 page.
youtube.com' [online]. "iOS 7 Notification Center Complete Walkthrough," Jun. 10, 2013, [retrieved on Apr. 23, 2019], retrieved from: URL<https://www.youtube.com/watch?v=gATXt-o42LA>. 3 pages.
youtube.com' [online]. "iOS Notification Banner Pull Down to Notification Center in iOS 7 Beta 5", Aug. 6, 2013, [retrieved on Apr. 23, 2019], retrieved from: URL<https://www.youtube.com/watch?v=nP0s6ETPxDg>. 2 pages.
youtube.com' [online]. "Notification & Control Center Problem Issue Solution" Dec. 6, 2013, [retrieved on Apr. 23, 2019], retrieved from: URL<https://www.voutube.com/watch?v=KOzCue YlaTA>. 3 pages.
youtube.com' [online]. "WeChat TVC—Hold To Talk", May 11, 2013, [retrieved on Apr. 23, 2019], retrieved from: URL<https://www.youtube.com/watch?v=E UxteOWVSo>. 2 page.
Australian Patent Examination Report No. 1 in Australian Application No. 2012202929, dated Sep. 28, 2013, 3 pages.
Chinese Office Action in Chinese Application No. 201210288784.3, dated Jul. 3, 2014, 16 pages (with English Translation).
European Search Report in European Application No. 12168980.6, dated Sep. 21, 2012, 7 pages.
International Preliminary Report on Patent Ability in International Application No. PCT/US/2012/038718, dated Nov. 26, 2013, 5 pages.

\* cited by examiner

LIVE LOCATION SHARING

CROSS-REFERENCE TO RELATED APPLICATIONS

This application is a continuation of U.S. patent application Ser. No. 14/503,270, entitled "Live Location Sharing," filed Sep. 30, 2014, which claims priority to U.S. Provisional Application No. 62/006,110, entitled "Live Location Sharing," filed. May 31, 2014, the entire contents of which is incorporated herein by reference. This application is also related to U.S. patent application Ser. Nos. 14/503,355, 14/503,376, 14/503,386, all of which are entitled "Message User Interfaces for Capture and Transmittal of Media and Location Content," all filed on May 31, 2014.

TECHNICAL FIELD

This disclosure relates generally to location-based services.

BACKGROUND

A mobile device may have an instant messaging (IM) program that allows a user of the mobile device to chat with another user over the Internet. The IM program can offer real-time ("live") transmission of text from the mobile device to a device of the other user, and receive and display real-time text received from the other device. The IM program can have a peer-to-peer or server-client architecture for transmitting the text in real-time.

SUMMARY

Techniques for live location sharing are described. A first mobile device and a second mobile device can communicate with one another using an IM program. The first mobile device can receive a user input to share a location of the first mobile device in the IM program. Sharing the location can include causing the second mobile device to display a location of the first mobile device in an IM program user interface on the second mobile device. Duration of sharing the location can be user-configurable. The second mobile device may or may not share a location of the second device for display in the IM program executing on the first mobile device.

The features described in this specification can be implemented to achieve one or more advantages. Compared to conventional IM program, the features described in this specification can allow chatting users to share more information. A user may see, in a user interface of the IM program, where the user's chatting partner is located. Likewise, the chatting partner can see where the user is located. Such information can enhance user experience, and can make tasks such as scheduling a gathering at a location easier. A user's privacy is protected according to the user's own preference as to with whom to share a location, and for how long.

The details of one or more implementations of the subject matter are set forth in the accompanying drawings and the description below. Other features, aspects, and advantages of the subject matter will become apparent from the description, the drawings, and the claims.

BRIEF DESCRIPTION OF THE DRAWINGS

Like reference symbols in the various drawings indicate like elements.

DETAILED DESCRIPTION

Exemplary Live Location Sharing

Figure 1:
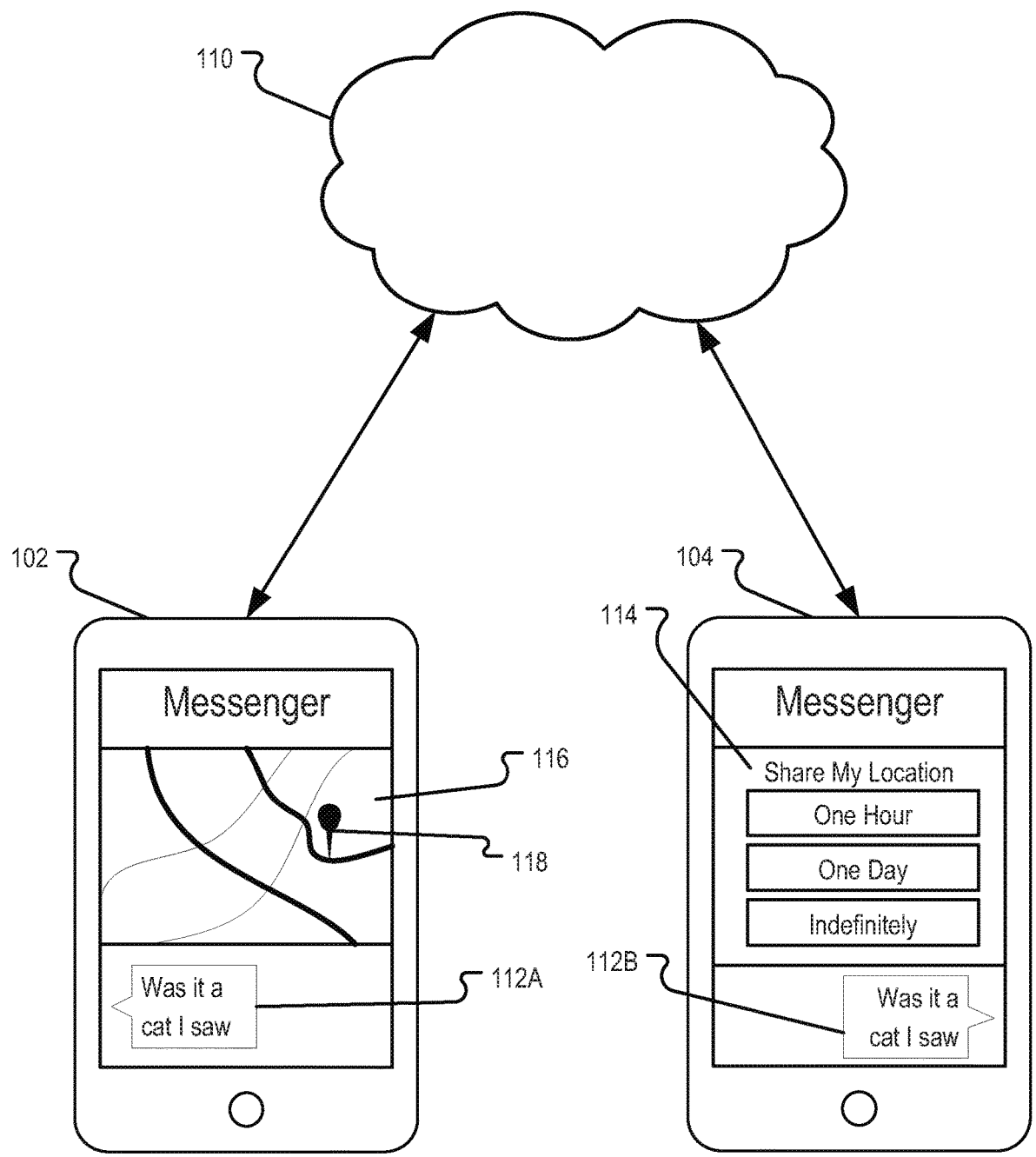
FIG. 1 is a diagram illustrating exemplary live location sharing.

FIG. 1 is a diagram illustrating exemplary live location sharing. Mobile device 102 can communicate with mobile device 104 over communications network 110 using an IM program. The IM program can be hosted on a server to which mobile device 102 and mobile device 104 connect. Alternatively, each of mobile device 102 and mobile device 104 can host a separate copy of an IM program. A first user of mobile device 102 and a second user of mobile device 104 may chat (112A, 112B) with each other online using the IM program.

During the chat, mobile device 104 can display location sharing interface 114 in response to an input from the second user. Location sharing interface 114 allows the second user to enable location sharing. Location sharing can include allowing mobile device 102 to see a real-time location of mobile device 104 in the IM program. Allowing mobile device 102 to see the location of mobile device 104 can include allowing mobile device 102 to access the location through a server. The location can be stored on mobile device 104, or submitted by mobile device 104 to be stored on the server temporarily for duration of location sharing.

Mobile device 104 receives the input to enable location sharing. In response, mobile device 104 notifies mobile device 102 of the location sharing. Mobile device 102 acquires the location of mobile device 104. Mobile device 102 can display virtual map 116 in the IM program. Mobile device 102 can represent the real-time location of mobile device 104 using marker 118 in virtual map 116. Marker 118 can move in virtual map 116, corresponding to physical movement of mobile device 104.

Exemplary User Interface

FIGS. 2A-2D illustrate exemplary user interfaces for live location sharing. Each user interface can be a user interface of an IM program executing on either mobile device 102 or mobile device 104 of FIG. 1. For convenience, each user interface will be described in reference to mobile device 102.

Figure 2A:
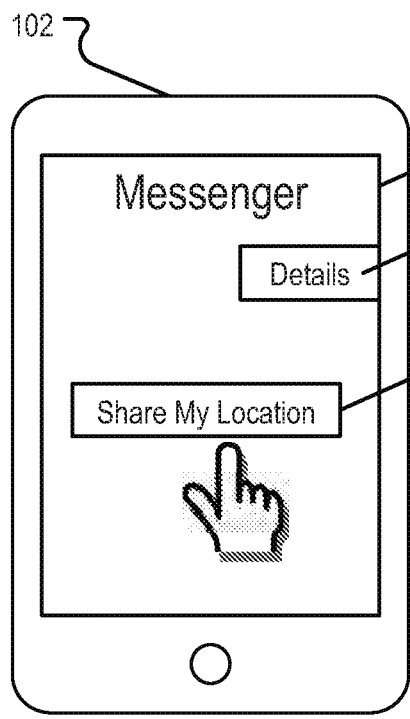
FIGS. 2A-2D illustrate exemplary user interfaces for live location sharing.

FIG. 2A illustrates exemplary user interface 202 for initiating live location sharing. The live location sharing can be sharing a location of mobile device 102 with a device that is in communication with mobile device through an IM program. The sharing can be limited to the IM program, where the shared location is visible in an IM program on the other device.

User interface 202 can include settings user interface item 204. Settings user interface item 204 can have a label "details" or any other label indicating that a user can access detailed settings of the IM program. Upon receiving a user input in settings user interface item 204, mobile device 102 can display a list of settings. One of the settings can be location sharing user interface item 206. Location sharing user interface item 206 can include a virtual button that, when touched, can cause mobile device 102 to display location sharing user interface 208.

Figure 2B:
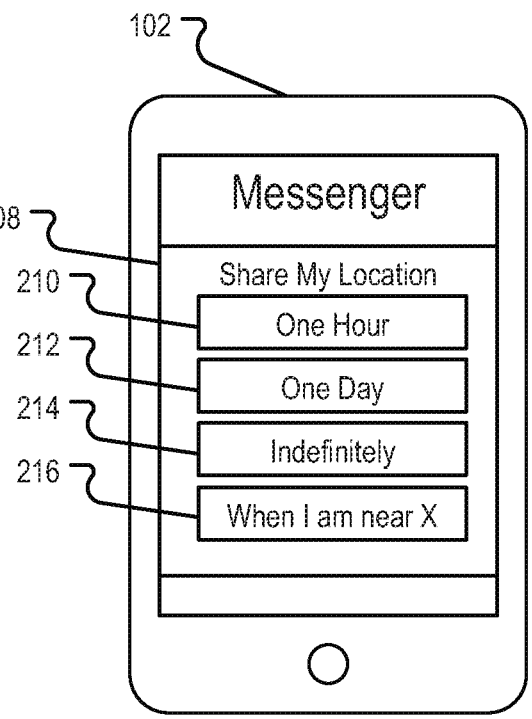

FIG. 2B illustrates exemplary location sharing user interface 208. Location sharing user interface 208 can include various user interface items for specifying when to share a location of mobile device 102 with another mobile device in an IM program. Location sharing user interface 208 can include virtual button 210 that, when selected, causes mobile device 102 to share location of mobile device 102 in an IM program for a first time period, e.g., one hour. Location sharing user interface 208 can include virtual button 212 that, when selected, causes mobile device 102 to share location of mobile device 102 in an IM program for a second time period, e.g., one day. Location sharing user interface 208 can include virtual button 214 that, when selected, causes mobile device 102 to share location of mobile device 102 in an IM program for a third time period, e.g., indefinitely. Location sharing user interface 208 can include virtual button 216 that, when selected, causes mobile device 102 to share location of mobile device 102 in an program with another device when mobile device 102 is in proximity with the other device and in communication with the other device. The proximity can be user defined, e.g., within a same country, within a same city, or within X miles or meters of one another.

Figure 2C:
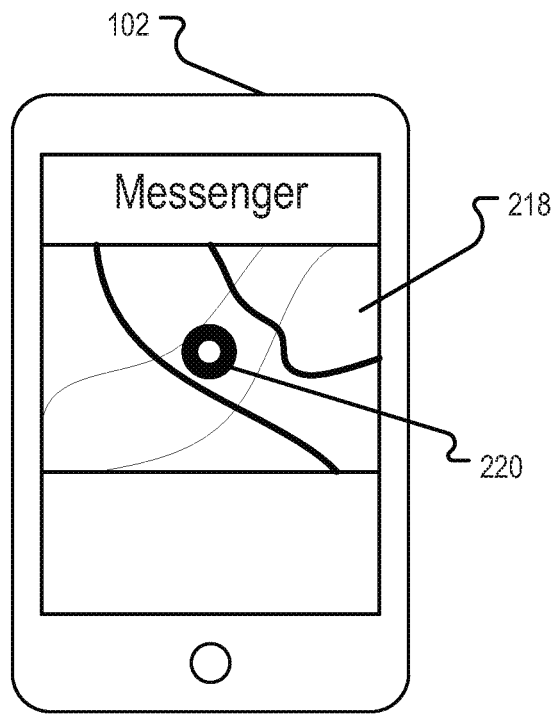

FIG. 2C illustrates exemplary map user interface 218 of an IM program executing on mobile device 102. Mobile device 102 can display map user interface 218 upon receiving a user confirmation for sharing the location. Map user interface 218 can include marker 220 indicating a current location of mobile device 102, as can be visible in an IM program on another device that receives the shared location. Accordingly, a user of mobile device 102 can be aware of what a user of the other device sees.

Figure 2D:
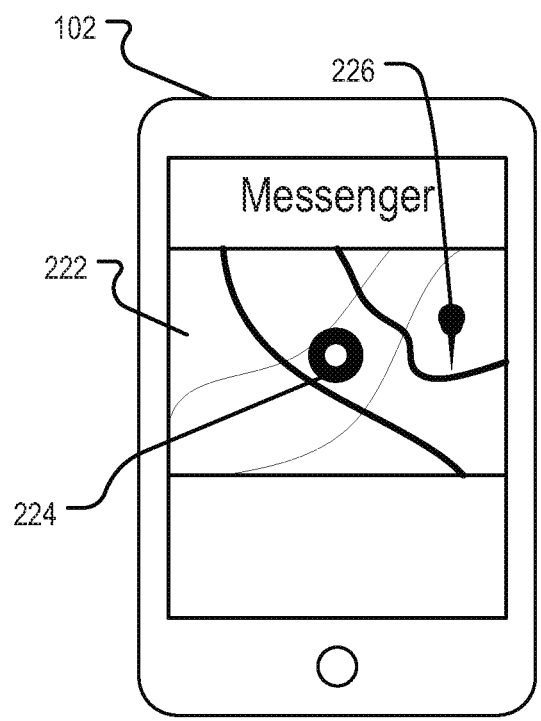

FIG. 2D illustrates exemplary map user interface 222 of an IM program executing on mobile device 102. Mobile device 102 is in communication with another mobile device using the program. Mobile device 102 shared location of mobile device 102 with the other device. The other device, in return, shared location of that device with mobile device 102. Mobile device 102 can display map user interface 222 that includes a virtual map, marker 224 indicating a real-time location of mobile device 102, and marker 226 indicating the real-time location of the other device.

Exemplary System Components

Figure 3:
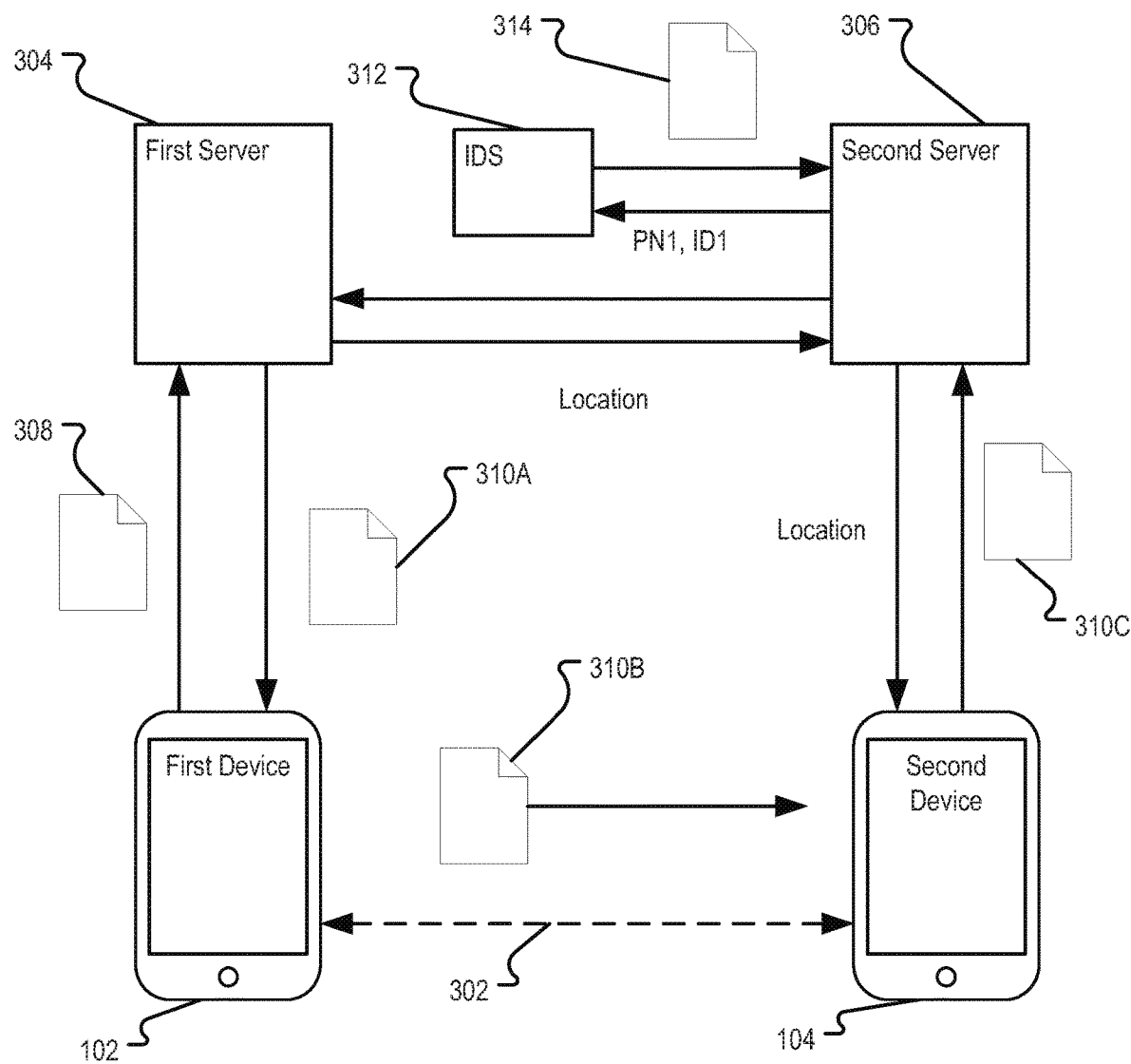
FIG. 3 is a block diagram illustrating exemplary interaction between mobile devices and their respective servers for live location sharing.

FIG. 3 is a block diagram illustrating exemplary interaction between mobile devices and their respective servers for live location sharing. Mobile device 102 and mobile device 104 can communicate with one another using communication channel 302. Communication channel 302 can be a communication channel for IM programs and can be based on a first telephone number PN1 of mobile device 102 and a second telephone number PN2 of mobile device 104. Mobile device 102 has logged into a user account on first server 304. The user account is associated with an account identifier ID1, e.g., an account name. Mobile device 104 has logged into a user account on second server 306. The user account is associated with an account identifier ID2.

Mobile device 102 received a user input requesting mobile device 102 to share a location of mobile device 102 with mobile device 104 in the IM program. In response, mobile device 102 can submit request 308 to server 304 requesting server 304 to provide location sharing information for passing to mobile device 104 through communication channel 302. In response, server 304 can provide mapping packet 310A to mobile device 102. Mapping packet 310A can include PN1 and ID1, and information on how long the location will be shared.

Mobile device 102 can submit mapping packet 310B, which can be the same as mapping packet 310A, to mobile device 104 through communication channel 302. Mobile device 104 provides the mapping packet 310B to server 306 as request 310C. Server 306 may already store the second telephone number PN2 of mobile device 104 and account identifier ID2.

Server 306 can submit the number PN1 and ID1 to an identity service (IDS) 312. The IDS 312 can include one or more computers configured to determine, based on PN1 and ID1, whether mobile device 102 is still logged in to server 304. The IDS 312 can send token 314 to server 306. Server 306 can submit token 314 to server 304. Server 304 can retrieve location of mobile device 102 and provide the location to server 306. Server 306 can, in turn, provide the location to mobile device 104 for displaying in the IM program.

Figure 4:
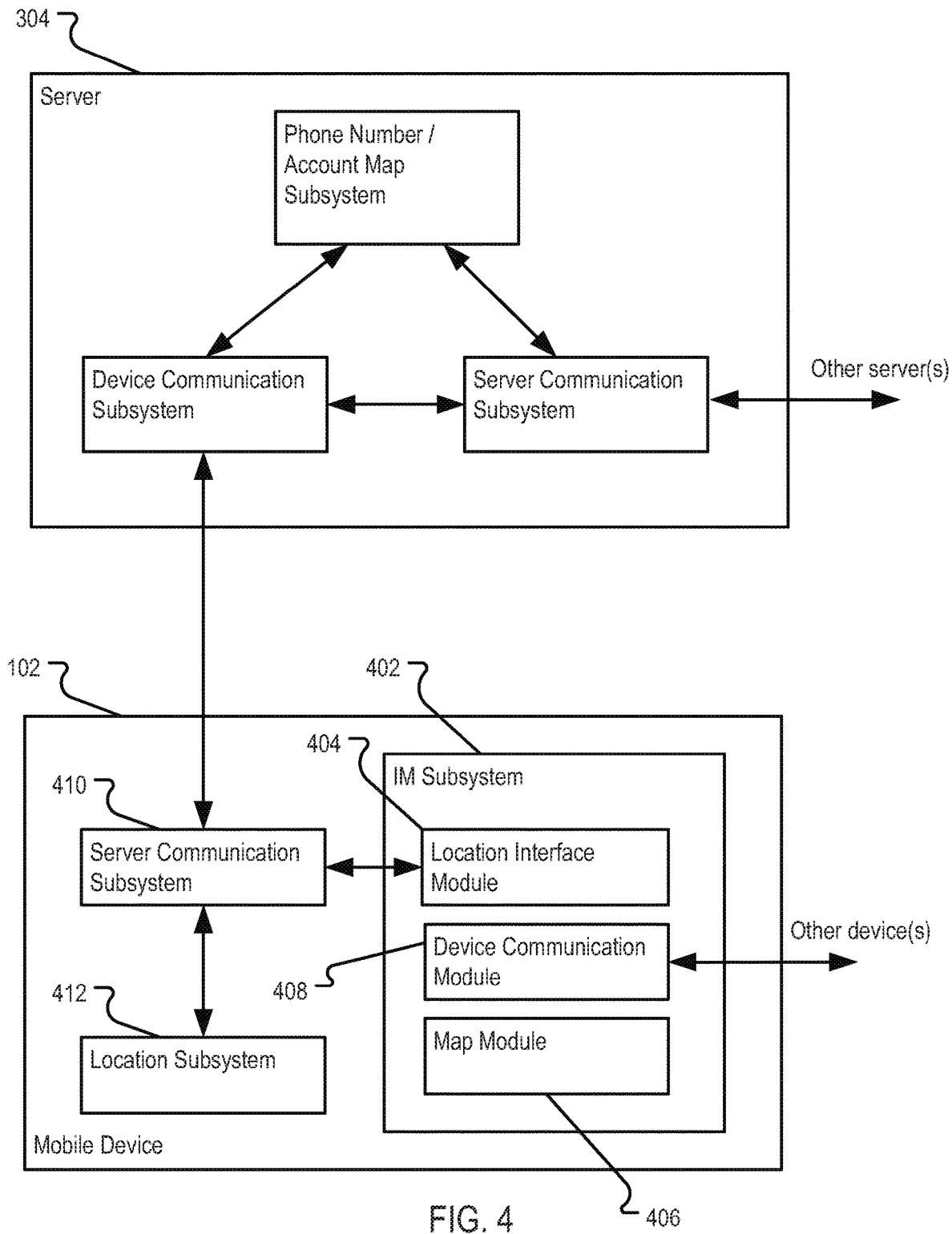
FIG. 4 is a block diagram illustrating components of an exemplary server and an exemplary mobile device for live location sharing.

FIG. 4 is a block diagram illustrating components of an exemplary server and an exemplary mobile device for live location sharing. The server can be either server 304 or server 306 (of FIG. 3). The mobile device can be either mobile device 102 or mobile device 104 (of FIG. 3). For convenience, FIG. 4 will be described in reference to server 304 and mobile device 102.

Mobile device 102 can include instant messaging subsystem 402. Instant messaging subsystem 402 is a component of mobile device 102 configured to execute an IM program and sharing a location of mobile device 102 in the IM program with another device. Instant messaging subsystem 402 can include location interface module 404 configured to share the location in the IM program. Instant messaging subsystem 402 can include map module 406 configured to display a map in the IM program, including displaying in the map the location of the mobile device 102 and, if a location of another device is shared, the location of the other device. Instant messaging subsystem 402 can include device communication module 408 configured to establish a telephone number based communication channel with another device and communicate with the other device using an IM program over that channel.

Mobile device 102 can include server communication subsystem 410. Server communication subsystem 410 is a component of mobile device 102 configured to send a request to server 304 for mapping packet upon receiving instructions from location interface module 404 to share location. Server communication subsystem 410 can receive the mapping packet from server 304.

If another device shares a location with mobile device 102, the other device can notify mobile device 102 of the sharing through device communication module 408. Location interface module 404 can then instruct server communication subsystem 410 to request the shared location from server 304. Location interface module 404 can provide the shared location to location interface module 404 for displaying in a map of the program.

Mobile device 102 can include location subsystem 412. Location subsystem 412 is a component of mobile device 102 configured to determine a location of mobile device 102, for example, by using signals from a cellular communication system, one or more wireless access points, or a global satellite navigation system.

Location subsystem 412 can provide the location to server communication subsystem 410 for submitting to the server for sharing.

Exemplary Procedures

Figure 5:
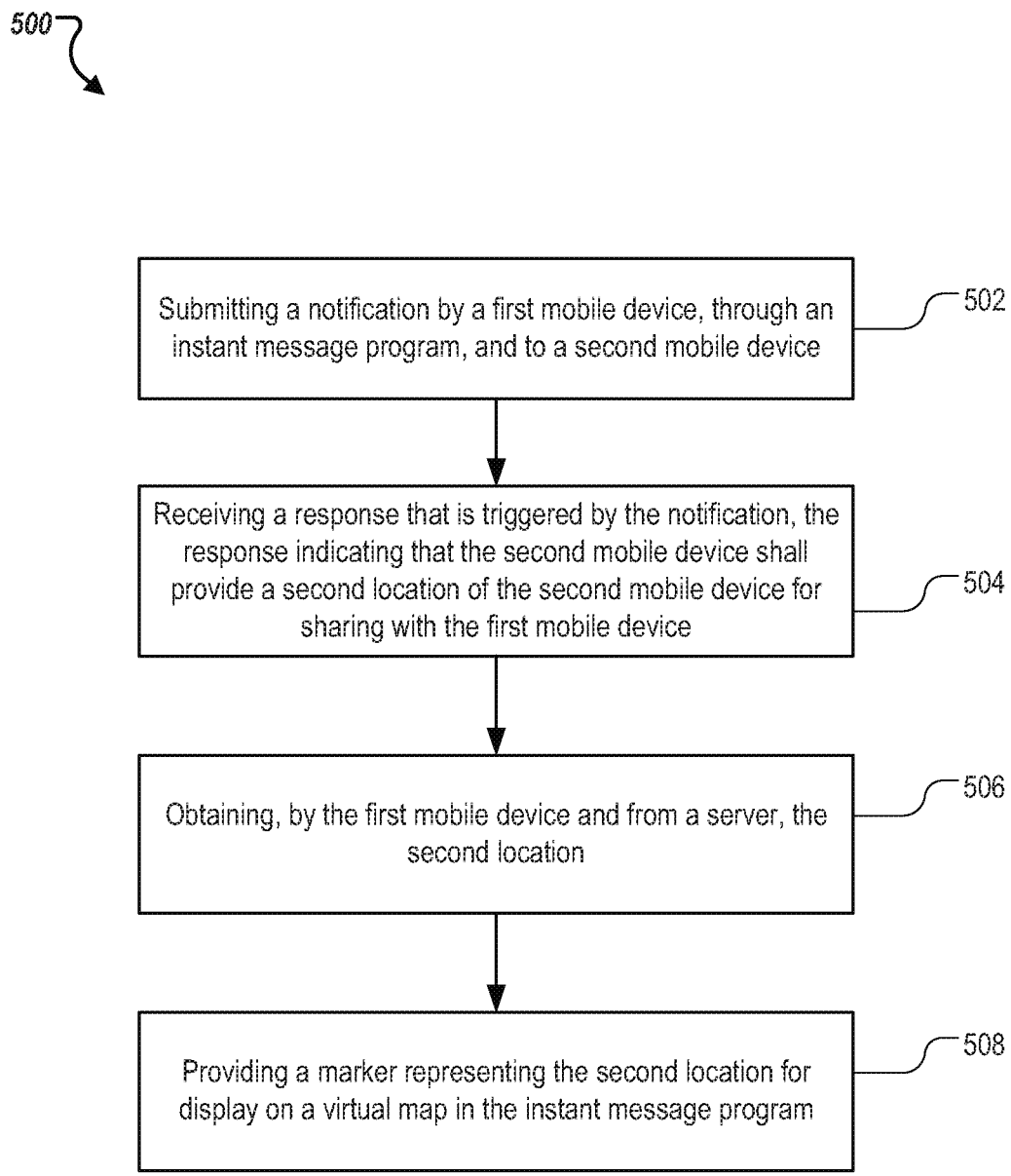
FIG. 5 is a flowchart of an exemplary process of live location sharing.

FIG. 5 is a flowchart of an exemplary process 500 of live location sharing. A first mobile device, e.g., mobile device 102, can submit (502) a notification to a second mobile device, e.g., mobile device 104, through an instant message program. The notification can indicate that the first mobile device shall provide a first location of the first mobile device for sharing with the second mobile device. At time of submitting the notification, the first mobile device and the second mobile device can be in communication through the instant message program. The communication can be established based on a phone number of the first mobile device and a phone number of the second mobile device.

The first mobile device can receive (504), through the instant message program and from the second mobile device, a response to the notification. The response can be triggered by the notification. The response can be approved by a user of the second mobile device. The response can indicate that the second mobile device shall provide a second location of the second mobile device for sharing with the first mobile device.

The first mobile device can obtain (506) from a server, the second location. The first mobile device can then provide (508) a marker representing the second location for display on a virtual map in the instant message program on the first mobile device. Likewise, the second mobile device can provide a marker representing the first location of the first mobile device for display on a virtual map in an instant message program on the second mobile device.

The first mobile device can obtain, from the server, one or more updates of the second location. The updates can correspond to a movement of the second mobile device. The first mobile device can provide a representation of updated second location for display in the instant message program on the first mobile device. The representation of the updated second location can indicate a path of the movement.

Figure 6:
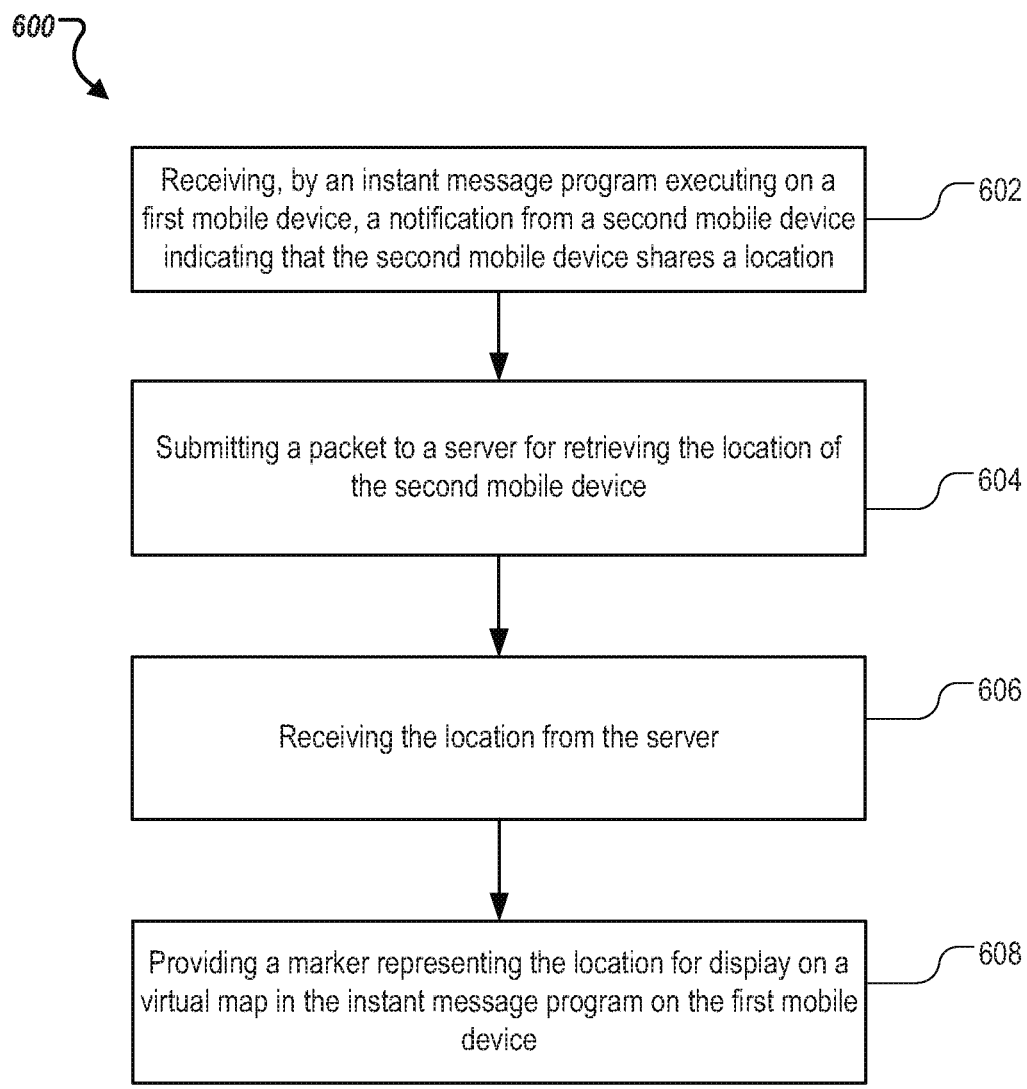
FIG. 6 is a flowchart of an exemplary process of live location sharing.

FIG. 6 is a flowchart of an exemplary process 600 of live location sharing. An instant message program executing on first mobile device, e.g., mobile device 102, can receive (602) a notification to a second mobile device, e.g., mobile device 104. The notification can indicate that the second mobile device shares a location of the second mobile device with the first mobile device. The notification can include a mapping packet including a phone number of the second mobile device and an account identifier of the second mobile device.

The first mobile device can submit (604) and to a server, the mapping packet including the phone number and the account identifier for retrieving the location of the second mobile device.

Upon successful authentication by the server indicating that the second mobile device is logged in and that a location of the second mobile device is available, the first mobile device can receive (606) the location from the server during a time period as specified by the second device for sharing the location. The time period can be an hour, a day, or an indefinite time period as specified by the second mobile device according to a user input in the instant message program.

The first mobile device then provides (608) a marker representing the location for display on a virtual map in the instant message program on the first mobile device. During the time period, the first mobile device can provide the marker representing the location of the second mobile device for display in one or more other programs for displaying locations. The programs can include, for example, a "find my friend" application program.

Figure 7:
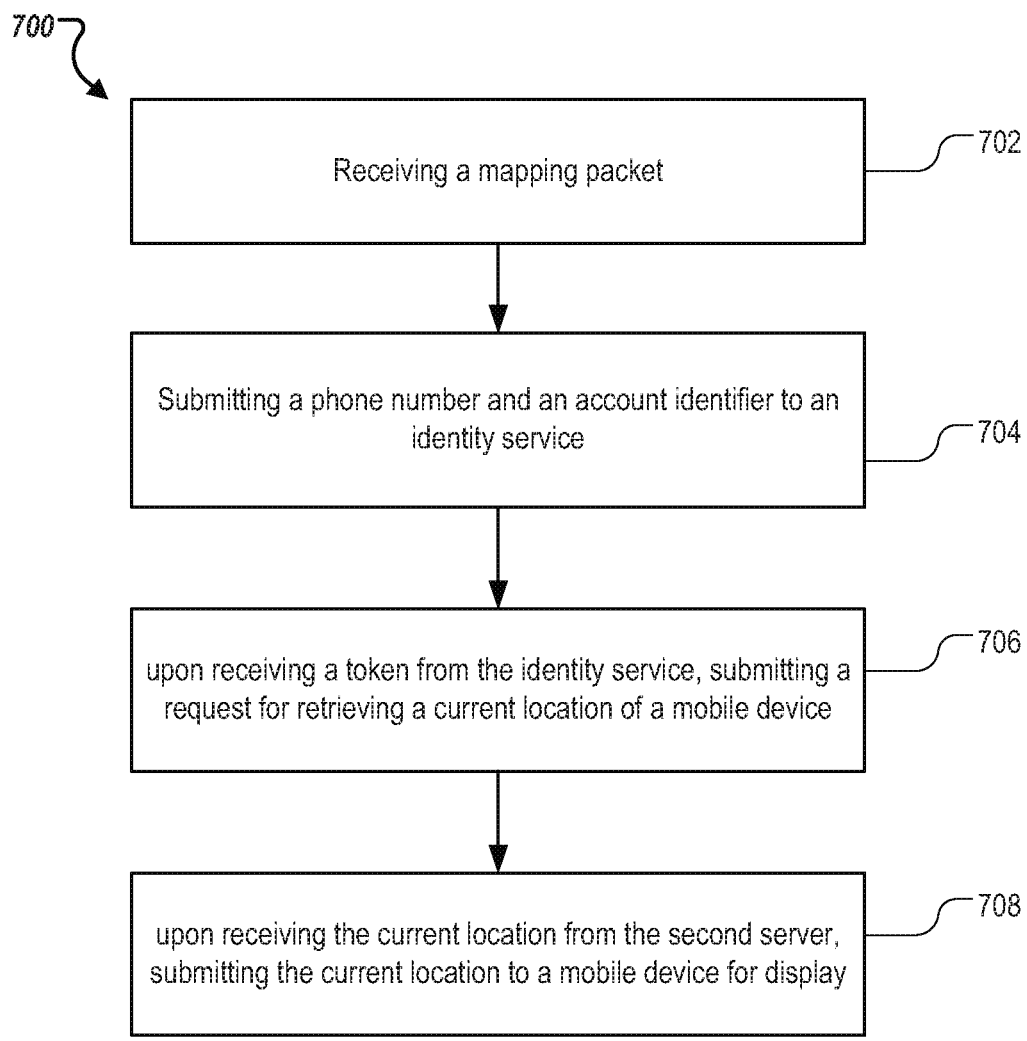
FIG. 7 is a flowchart of an exemplary process of live location sharing.

FIG. 7 is a flowchart of an exemplary process 700 of live location sharing. A first server, e.g., server 304 of FIG. 3 can receive (702) a mapping packet from an instant message program of a first mobile device, e.g., mobile device 102. The mapping packet can include a phone number of a second mobile device, e.g., mobile device 104. The mapping packet can include an account identifier of the second mobile device. The mapping packet can indicate that the second mobile device has shared a location of the second mobile device with the first mobile device in the instant message program. The first server can be connected to the first mobile device by a communications network.

The second server can be connected to the second mobile device by the communications network. The first mobile device and the second mobile device can be connected to one another by the same communications network or a different communications network.

The first server can submit (704) the phone number and the account identifier to an identity service for determining whether the second mobile device is logged into the account on a second server. The identity service can provide a token indicating that the second mobile device is logged into the account.

Upon receiving the token from the identity service, the first server can submit (706) a request to the second server for retrieving a current location of the second mobile device. The request can include the account identifier of the second mobile device. The current location of the second mobile device can be received by the second server from the second mobile device in response to an input on the second mobile device indicating that the second mobile device shares location of the second mobile device with the first mobile device.

Upon receiving the current location from the second server, the first server can submit (708) the current location to the first mobile device for display in the instant message program.

Exemplary Mobile Device Architecture

Figure 8:
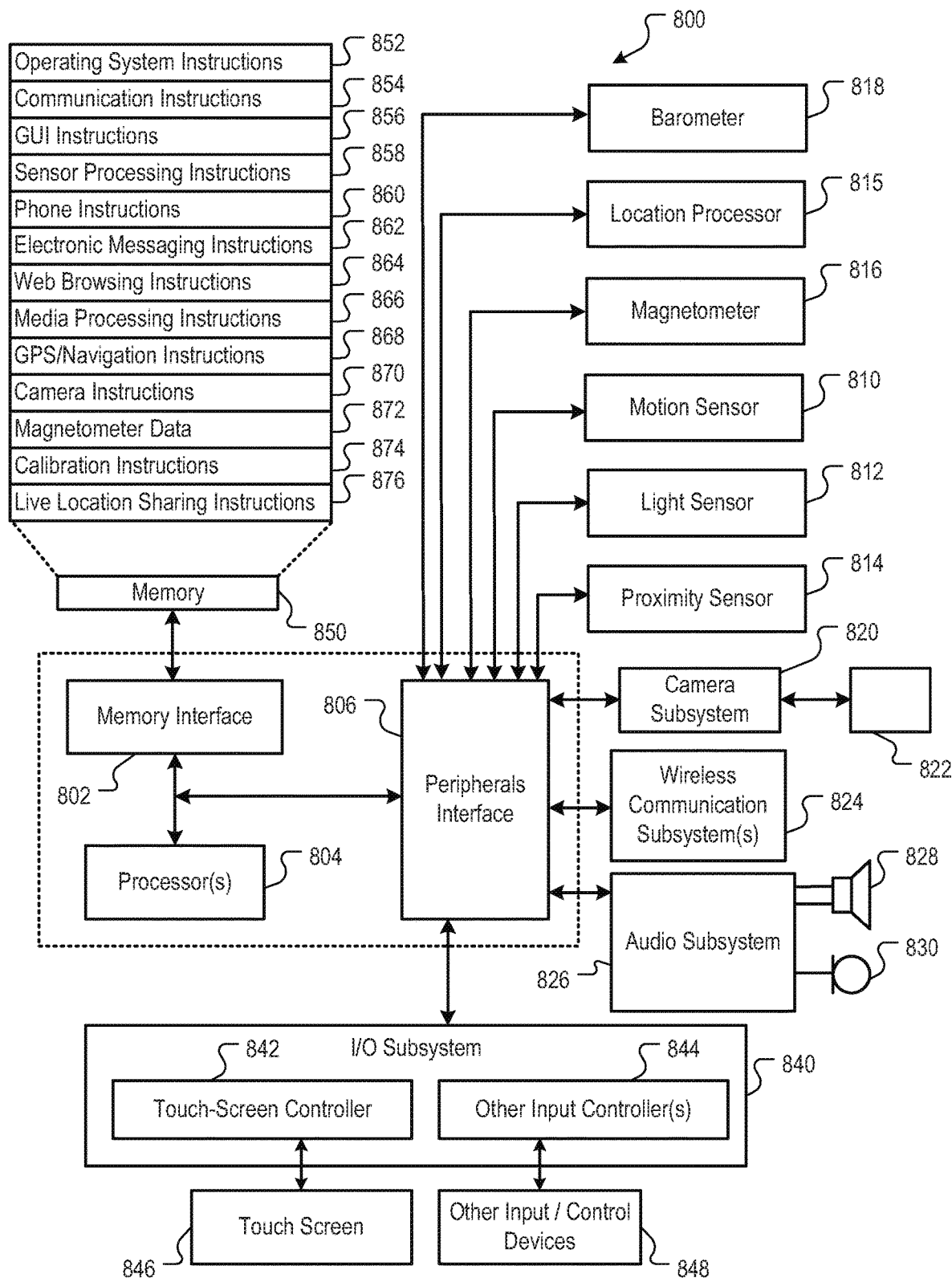
FIG. 8 is a block diagram illustrating an exemplary device architecture of a mobile device implementing the features and operations described in reference to FIGS. 1-7.

FIG. 8 is a block diagram of an exemplary architecture 800 for the mobile devices of FIGS. 1-7. A mobile device (e.g., mobile device 102) can include memory interface 802, one or more data processors, image processors and/or processors 804, and peripherals interface 806. Memory interface 802, one or more processors 804 and/or peripherals interface 806 can be separate components or can be integrated in one or more integrated circuits. Processors 804 can include application processors, baseband processors, and wireless processors. The various components in mobile device 102, for example, can be coupled by one or more communication buses or signal lines.

Sensors, devices, and subsystems can be coupled to peripherals interface 806 to facilitate multiple functionalities. For example, motion sensor 810, light sensor 812, and proximity sensor 814 can be coupled to peripherals interface 806 to facilitate orientation, lighting, and proximity functions of the mobile device. Location processor 815 (e.g., GPS receiver) can be connected to peripherals interface 806 to provide geopositioning. Electronic magnetometer 816 (e.g., an integrated circuit chip) can also be connected to peripherals interface 806 to provide data that can be used to determine the direction of magnetic North. Thus, electronic magnetometer 816 can be used as an electronic compass. Motion sensor 810 can include one or more accelerometers configured to determine change of speed and direction of movement of the mobile device. Barometer 818 can include one or more devices connected to peripherals interface 806 and configured to measure pressure of atmosphere around the mobile device.

Camera subsystem 820 and an optical sensor 822, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 824, which can include radio frequency receivers and transmitters and/or optical (e.g., infrared) receivers and transmitters. The specific design and implementation of the communication subsystem 824 can depend on the communication network(s) over which a mobile device is intended to operate. For example, a mobile device can include communication subsystems 824 designed to operate over a GSM network, a CPRS network, an EDGE network, a Wi-Fi™ or WiMax™ network, and a Bluetooth™ network. In particular, the wireless communication subsystems 824 can include hosting protocols such that the mobile device can be configured as a base station for other wireless devices.

Audio subsystem 826 can be coupled to a speaker 828 and a microphone 830 to facilitate voice-enabled functions, such as voice recognition, voice replication, digital recording, and telephony functions. Audio subsystem 826 can be configured to receive voice commands from the user.

I/O subsystem 840 can include touch surface controller 842 and/or other input controller(s) 844. Touch surface controller 842 can be coupled to a touch surface 846 or pad. Touch surface 846 and touch surface controller 842 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch surface 846. Touch surface 846 can include, for example, a touch screen.

Other input controller(s) 844 can be coupled to other input/control devices 848, such as one or more buttons, rocker switches, thumb-wheel, infrared port, USB port, and/or a pointer device such as a stylus. The one or more buttons (not shown) can include an up/down button for volume control of speaker 828 and/or microphone 830.

In one implementation, a pressing of the button for a first duration may disengage a lock of the touch surface 846; and a pressing of the button for a second duration that is longer than the first duration may turn power to mobile device 102 on or off. The user may be able to customize a functionality of one or more of the buttons. The touch surface 846 can, for example, also be used to implement virtual or soft buttons and/or a keyboard.

In some implementations, mobile device 102 can present recorded audio and/or video files, such as MP3, AAC, and MPEG files. In some implementations, mobile device 102 can include the functionality of an MP3 player. Mobile device 102 may, therefore, include a pin connector that is compatible with the MP3 player. Other input/output and control devices can also be used.

Memory interface 802 can be coupled to memory 850. Memory 850 can include high-speed random access memory and/or non-volatile memory, such as one or more magnetic disk storage devices, one or more optical storage devices, and/or flash memory (e.g., NAND, NOR). Memory 850 can store operating system 852, such as Darwin, RTXC, LINUX, UNIX, OS X, WINDOWS, or an embedded operating system such as VxWorks. Operating system 852 may include instructions for handling basic system services and for performing hardware dependent tasks. In some implementations, operating system 852 can include a kernel (e.g., UNIX kernel).

Memory 850 may also store communication instructions 854 to facilitate communicating with one or more additional devices, one or more computers and/or one or more servers. Memory 850 may include graphical user interface instructions 856 to facilitate graphic user interface processing; sensor processing instructions 858 to facilitate sensor-related processing and functions; phone instructions 860 to facilitate phone-related processes and functions; electronic messaging instructions 862 to facilitate electronic-messaging related processes and functions; web browsing instructions 864 to facilitate web browsing-related processes and functions; media processing instructions 866 to facilitate media processing-related processes and functions; GPS/Navigation instructions 868 to facilitate GPS and navigation-related processes and instructions; camera instructions 870 to facilitate camera-related processes and functions; magnetometer data 872 and calibration instructions 874 to facilitate magnetometer calibration. The memory 850 may also store other software instructions (not shown), such as security instructions, web video instructions to facilitate web video-related processes and functions, and/or web shopping instructions to facilitate web shopping-related processes and functions. In some implementations, the media processing instructions 866 are divided into audio processing instructions and video processing instructions to facilitate audio processing-related processes and functions and video processing-related processes and functions, respectively. An activation record and international Mobile Equipment Identity (MEI) or similar hardware identifier can also be stored in memory 850. Memory 850 can store live location sharing instructions 876 that, when executed, can cause processor 804 to perform operations of live location sharing, e.g., procedures as described in reference to FIG. 5 and FIG. 6.

Each of the above identified instructions and applications can correspond to a set of instructions for performing one or more functions described above. These instructions need not be implemented as separate software programs, procedures, or modules. Memory 850 can include additional instructions or fewer instructions. Furthermore, various functions of the mobile device may be implemented in hardware and/or in software, including in one or more signal processing and/or application specific integrated circuits.

Exemplary Operating Environment

Figure 9:
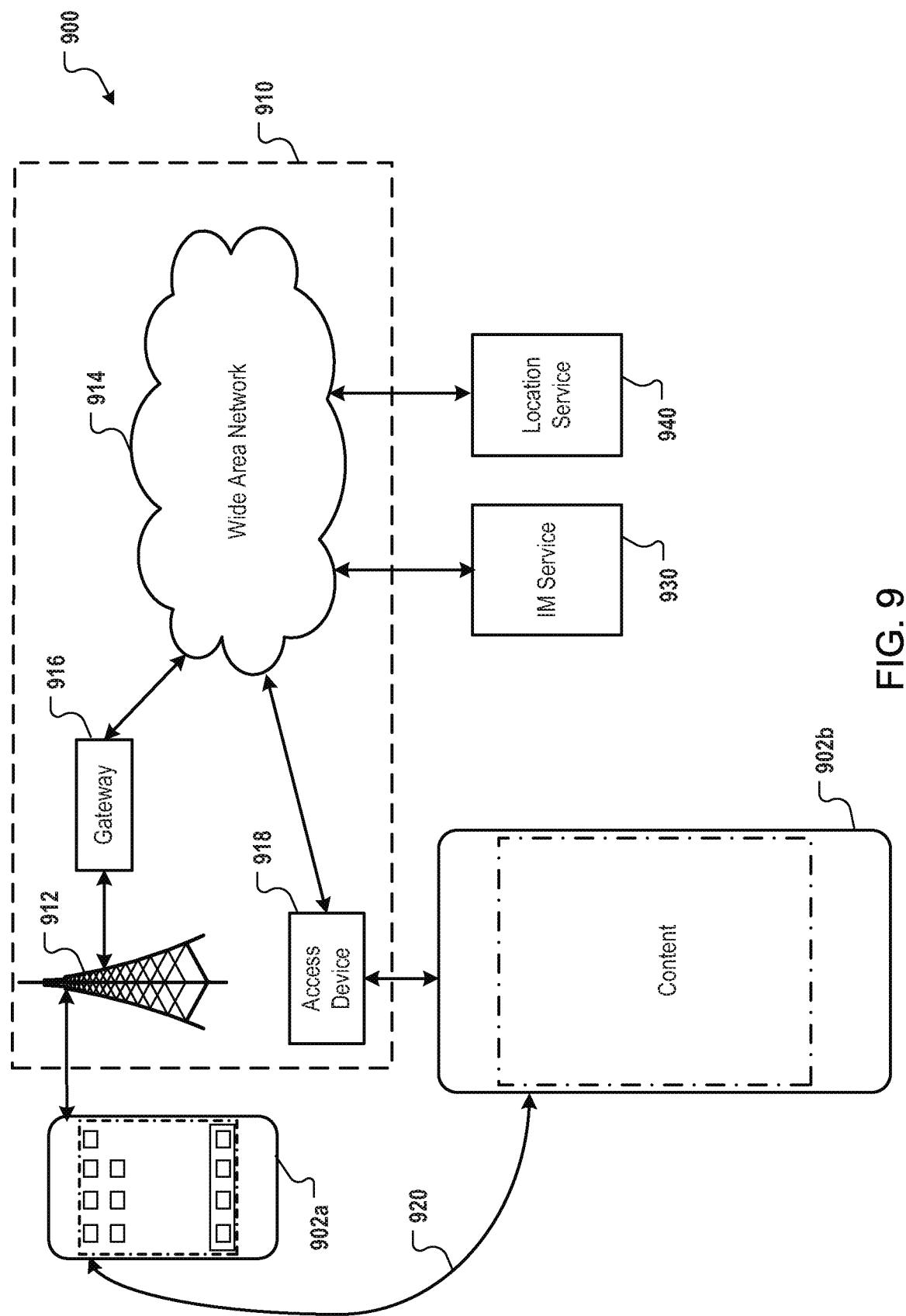
FIG. 9 is a block diagram of an exemplary network operating environment for the mobile devices of FIGS. 1-7.

FIG. 9 is a block diagram of an exemplary network operating environment 900 for the mobile devices of FIGS. 1-7. Mobile devices 902a and 902b can, for example, communicate over one or more wired and/or wireless networks 910 in data communication. For example, a wireless network 912, e.g., a cellular network, can communicate with a wide area network (WAN) 914, such as the Internet, by use of a gateway 916. Likewise, an access device 918, such as an 802.11g wireless access point, can provide communication access to the wide area network 914. Each of mobile devices 902a and 902b can be mobile device 102 and mobile device 104, respectfully, configured to communicate with one another using an instant messaging program and to share a respective location in the instant messaging program.

In some implementations, both voice and data communications can be established over wireless network 912 and the access device 918. For example, mobile device 902a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 912, gateway 916, and wide area network 914 (e.g., using Transmission Control Protocol/Internet Protocol (TCP/IP) or User Datagram Protocol (UDP)). Likewise, in some implementations, the mobile device 902b can place and receive phone calls, send and receive e-mail messages, and retrieve electronic documents over the access device 918 and the wide area network 914. In some implementations, mobile device 902a or 902b can be physically connected to the access device 918 using one or more cables and the access device 918 can be a personal computer. In this configuration, mobile device 902a or 902b can be referred to as a "tethered" device.

Mobile devices 902a and 902b can also establish communications by other means. For example, wireless device 902a can communicate with other wireless devices, e.g., other mobile devices, cell phones, etc., over the wireless network 912. Likewise, mobile devices 902a and 902b can establish peer-to-peer communications 920, e.g., a personal area network, by use of one or more communication subsystems, such as the Bluetooth™ communication devices. Other communication protocols and topologies can also be implemented.

The mobile device 902a or 902b can, for example, communicate with one or more services 930 and 940 over the one or more wired and/or wireless networks. For example, instant messaging services 930 can allow mobile devices 902a and 902b to communicate with one another using an instant messaging program. Location service 940 can provide the location and map data to mobile devices 902a and 902b for determining locations of mobile devices 902a and 902b.

Mobile device 902a or 902b can also access other data and content over the one or more wired and/or wireless networks. For example, content publishers, such as news sites, Really Simple Syndication (RSS) feeds, web sites, blogs, social networking sites, developer networks, etc., can be accessed by mobile device 902a or 902b. Such access can be provided by invocation of a web browsing function or application (e.g., a browser) in response to a user touching, for example, a Web object.

A number of implementations of the invention have been described. Nevertheless, it will be understood that various modifications can be made without departing from the spirit and scope of the invention.

Exemplary System Architecture

Figure 10:
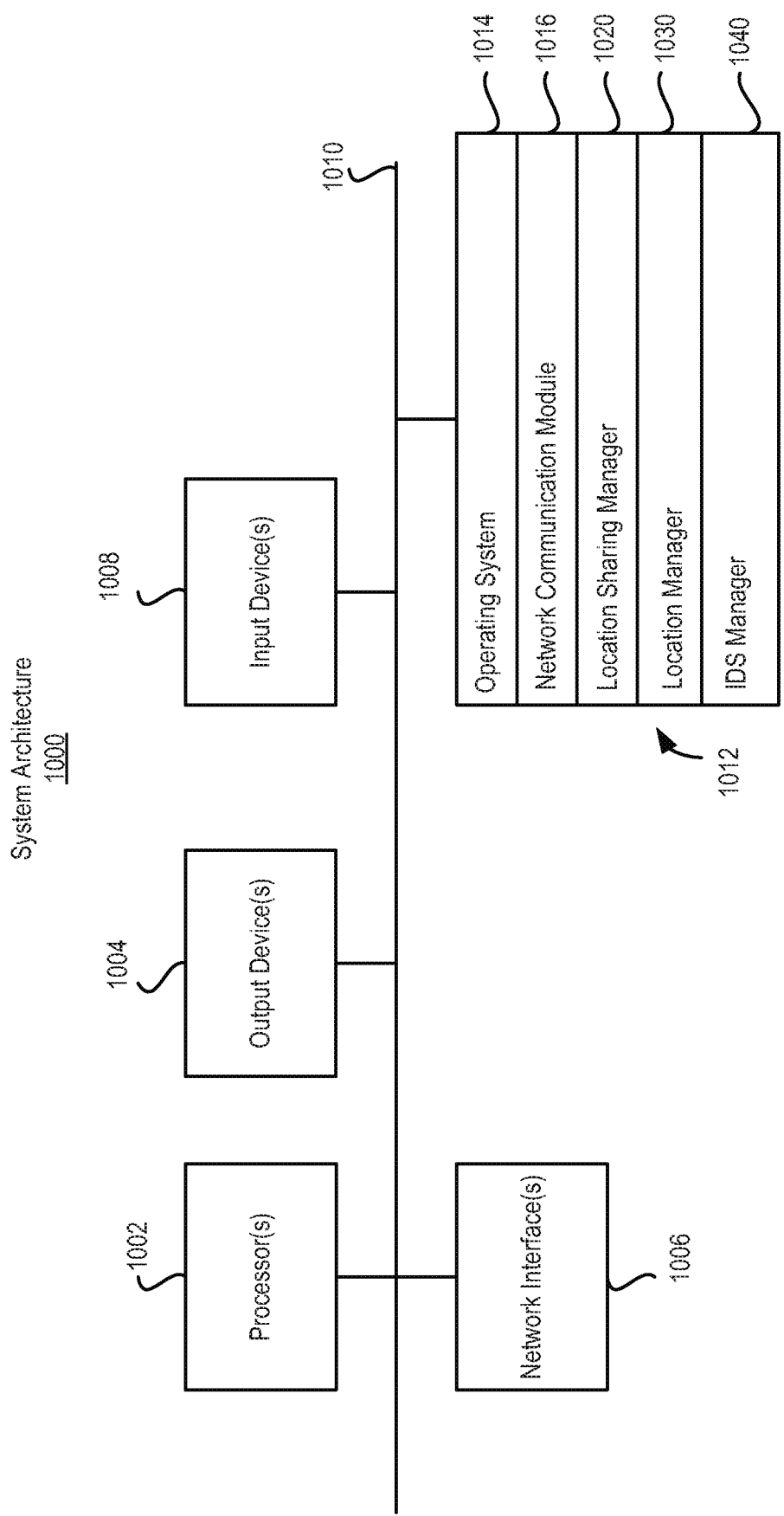
FIG. 10 is a block diagram of an exemplary system architecture for implementing the features and operations of FIGS. 1-7.

FIG. 10 is a block diagram of an exemplary system architecture for implementing the features and operations of FIGS. 1-7. Other architectures are possible, including architectures with more or fewer components. In some implementations, architecture 1000 includes one or more processors 1002 (e.g., dual-core Intel® Xeon® Processors), one or more output devices 1004 (e.g., LCD), one or more network interfaces 1006, one or more input devices 1008 (e.g., mouse, keyboard, touch-sensitive display) and one or more computer-readable media 1012 (e.g., RAM, ROM, SDRAM, hard disk, optical disk, flash memory, etc.). These components can exchange communications and data over one or more communication channels 1010 (e.g., buses which can utilize various hardware and software for facilitating the transfer of data and control signals between components.

The term "computer-readable medium" refers to a medium that participates in providing instructions to processor 1002 for execution, including without limitation, non-volatile media (e.g., optical or magnetic disks), volatile media (e.g., memory) and transmission media. Transmission media includes, without limitation, coaxial cables, copper wire and fiber optics.

Computer-readable media 1012 can further include operating system 1014 (e.g., a Linux® operating system), network communication module 1016, location sharing manager 1020, location manager 1030, and identity service manager 1040. Operating system 1014 can be multi-user, multiprocessing, multitasking, multithreading, real time, etc. Operating system 1014 performs basic tasks, including but not limited to: recognizing input from and providing output to devices 1006, 1008; keeping track and managing files and directories on computer-readable media 1012 (e.g., memory or a storage device); controlling peripheral devices; and managing traffic on the one or more communication channels 1010. Network communications module 1016 includes various components for establishing and maintaining network connections (e.g., software for implementing communication protocols, such as TCP/IP, HTTP, etc.).

Location sharing manager 1020 can include computer instructions that, when executed, cause processor 1002 to perform operations of location sharing, e.g., procedure 700 as described in reference to FIG. 7. Location manager 1030 can include computer instructions that, when executed, cause processor 1002 to provide location of mobile device and virtual maps to a mobile device. Identity service manager 1040 can include computer instructions that, when executed, cause processor 1002 to perform functions of identity services 312 as described in reference to FIG. 3.

Architecture 1000 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semi-conductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor or a retina display device for displaying information to the user. The computer can have a touch surface input device (e.g., a touch screen) or a keyboard and a pointing device such as a mouse or a trackball by which the user can provide input to the computer. The computer can have a voice input device for receiving voice commands from the user.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described. In the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted. In the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed. In a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A non-transitory machine-readable medium storing instructions which, when executed by one or more processors, cause the one or more processors to perform operations comprising:
   on a first mobile device, receiving a request to create a message within a messenger application displayed on a graphical interface of the first mobile device, the message to be sent to a second mobile device;
   presenting a message interface within the messenger application;
   presenting, via the message interface, a location sharing user interface item;
   receiving an input via the message interface to select the location sharing user interface item;
   generating first location data representing a current location of the first mobile device;
   presenting a representation of the first location data on the graphical interface of the first mobile device, the representation of the first location data and the message to be sent being presented concurrently on the message interface;

presenting a prompt to confirm the sharing of the location of the first mobile device with the second mobile device;

receiving an input via a user interface of the first mobile device to confirm the sharing of the location of the first mobile device with the second mobile device;

transmitting, via the messenger application, an account identifier for the second mobile device for submission to an identity service;

upon receipt of a token from the identity service, via the messenger application, that authenticates the second mobile device associated with the account identifier is logged in to a user account, receiving a second location data for the second mobile device;

presenting a representation of a second location data on the graphical interface of the first mobile device; and transmitting a message from the first mobile device to the second mobile device via the messenger application, the message including an indication of the location of the first mobile device.

2. The non-transitory machine-readable medium as in claim 1, the operations further comprising transmitting, by the first mobile device, the message to a server, the server to relay the message to the second mobile device via an identifier associated with the second mobile device.

3. The anon-transitory machine-readable medium as in claim 2, wherein the identifier associated with the second mobile device is the account identifier of the user account associated with the second mobile device or a phone number associated with the second mobile device.

4. The lion-transitory machine-readable medium as in claim 2, wherein the message interface including a settings user interface item which, when selected, causes presentation of the location sharing user interface item.

5. The non-transitory machine-readable medium as in claim 1, the operations further comprising receiving, via the messenger application, an indication of a location of the second mobile device.

6. The non-transitory machine-readable medium as in claim 5, additionally comprising, after receiving, via the messenger application, the indication of the location of the second mobile device, presenting, via the messenger application, a map including a representation of the location of the second mobile device.

7. A system on a first mobile device, the system comprising:
a memory to store instructions;
one or more processors to execute the instructions, wherein the instructions, when executed, cause the one or more processors to:
receive a request to create a message within a messenger application displayed on a graphical interface of the first mobile device, the message to be sent to a second mobile device;
present a message interface within the messenger application;
present, via the message interface, a location sharing user interface item;
receive an input via the message interface to select the location sharing user interface item
generate first location data representing a current location of the first mobile device;
present a representation of the first location data on the graphical interface of the first mobile device, the representation of the first location data and the message to be sent being presented concurrently on the message interface;

present a prompt to confirm the sharing of the location of the first mobile device with the second mobile device;

receive an input via a user interface of the first mobile device to confirm the sharing of the location of the first mobile device with the second mobile device;

transmit, via the messenger application, an account identifier for the second mobile device for submission to an identity service;

upon receipt of a token from the identity service, via the messenger application, that authenticates the second mobile device associated with the account identifier is logged in to an account, receiving a second location for the second mobile device;

present a representation of a second location data on the graphical interface of the first mobile device; and transmit a message from the first mobile device to the second mobile device via the messenger application, the message including an indication of the location of the first mobile device.

8. The system as in claim 7, the one or more processors further to transit the message to a server, the server to relay the message to the second mobile device via an identifier associated with the second mobile device.

9. The system as in claim 8, wherein the identifier associated with the second mobile device includes the account identifier of the user account associated with the second mobile device or a phone number associated with the second mobile device.

10. The system as in claim 8, wherein the message interface including a settings user interface item which, when selected, causes presentation of the location sharing user interface item.

11. The system as in claim 7, wherein the one or more processors are further to:
receive via the messenger application, an indication of a location of the second mobile device; and
after receipt of the indication of the location of the second mobile device, present, via the messenger application, a map including a representation of the location of the second mobile device.

12. A method comprising:
on a first mobile device, receiving a request to create a message within a messenger application displayed on a graphical interface of the first mobile device, the message to be sent to a second mobile device;
presenting a message interface within the messenger application;
presenting, via the message interface, a location sharing user interface item;
receiving an input via the message interface to select the location sharing user interface item;
generating first location data representing a current location of the first mobile device;
presenting a representation of the first location data on the graphical interface of the first mobile device, the representation of the first location data and the message to be sent being presented concurrently on the message interface;
presenting a prompt to confirm the sharing of the location of the first mobile device with the second mobile device;
receiving an input via a user interface of the first mobile device to confirm the sharing of the location of the first mobile device with the second mobile device;

transmitting, via the messenger application, an account identifier for the second mobile device for submission to an identity service;

upon receipt of a token, from the identity service, via the messenger application, that authenticates the second mobile device associated with the account identifier is logged in to a user account, receiving a second location data for the second mobile device;

presenting a representation of a second location data on the graphical interface of the first mobile device; and transmitting a message from the first mobile device to the second mobile device via the messenger application, the message including an indication of the location of the first mobile device.

13. The method as in claim 12, further comprising transmitting, by the first mobile device, the message to a server, the server to relay the message to the second mobile device via an identifier associated with the second mobile device.

14. The method as in claim 13, wherein the identifier associated with the second mobile device includes the account identifier of the user account associated with the second mobile device or a phone number associated with the second mobile device.

15. The method as in claim 14, wherein the message interface including a settings user interface item which, when selected, causes presentation of the location sharing user interface item.

16. The method as in claim 12, further comprising receiving, via the messenger application, an indication of a location of the second mobile device.

17. The method as in claim 16, further comprising, after receiving the indication of the location of the second mobile device, presenting, via the messenger application, a map including a representation of the location of the second mobile device.

18. A method comprising:

receiving, by a first mobile device, an account identifier and a notification from a second mobile device indicating that the second mobile device confirms a request to share a location of the second mobile device with the first mobile device;

submitting, via a messaging application by the first mobile device, the account identifier to an identity service for retrieving the location of the second mobile device;

upon receipt, via the messaging application, of a token indicating successful authentication by the identity service that the second mobile device is logged in, receiving the location by the first mobile device during a time period as specified by the second device for sharing the location; and providing a marker representing the location for display on a map in a graphical user interface on the first mobile device.

19. The method of claim 1, wherein the messaging application comprises a first server that receives the token from the identity service and the first server is operable to send the token to a second server to retrieve the location.

20. The method of claim 18, wherein the account identifier is a user account name associated with the second mobile device or a phone number associated with the second mobile device.

* * * * *

UNITED STATES PATENT AND TRADEMARK OFFICE
CERTIFICATE OF CORRECTION

PATENT NO. : 11,943,191 B2
APPLICATION NO. : 16/532349
DATED : March 26, 2024
INVENTOR(S) : Roberto Garcia et al.

It is certified that error appears in the above-identified patent and that said Letters Patent is hereby corrected as shown below:

In the Claims

Column 13,
Line 26, Claim 3, delete "anon-transitory" and insert in place there of --non-transitory--

Column 13,
Lines 31, Claim 4, delete "lion-transitory" and insert in place there of --non-transitory--

Signed and Sealed this
Seventh Day of May, 2024

Katherine Kelly Vidal
*Director of the United States Patent and Trademark Office*